United States Patent
Goodrich et al.

(10) Patent No.: US 11,691,107 B2
(45) Date of Patent: Jul. 4, 2023

(54) CONTINUOUS DIAFILTRATION BY MEANS OF TANK CYCLING

(71) Applicant: EMD Millipore Corporation, Burlington, MA (US)

(72) Inventors: Elizabeth M. Goodrich, Bedford, MA (US); Akshat Gupta, Tewksbury, MA (US); Herbert Lutz, Playa del Rey, CA (US)

(73) Assignee: EMD Millipore Corporation, Burlington, MA (US)

( * ) Notice: Subject to any disclaimer, the term of this patent is extended or adjusted under 35 U.S.C. 154(b) by 452 days.

(21) Appl. No.: 16/762,688

(22) PCT Filed: Nov. 1, 2018

(86) PCT No.: PCT/US2018/058660
§ 371 (c)(1),
(2) Date: May 8, 2020

(87) PCT Pub. No.: WO2019/094249
PCT Pub. Date: May 16, 2019

(65) Prior Publication Data
US 2021/0170336 A1  Jun. 10, 2021

Related U.S. Application Data

(60) Provisional application No. 62/585,132, filed on Nov. 13, 2017.

(51) Int. Cl.
*B01D 63/00* (2006.01)
*B01D 61/18* (2006.01)
(Continued)

(52) U.S. Cl.
CPC .......... *B01D 61/146* (2022.08); *B01D 61/18* (2013.01); *B01D 61/22* (2013.01); *B01D 65/02* (2013.01);
(Continued)

(58) Field of Classification Search
CPC ...... B01D 61/146; B01D 61/18; B01D 61/22; B01D 65/02; B01D 2311/04;
(Continued)

(56) References Cited

U.S. PATENT DOCUMENTS 6,001,242 A   12/1999  England et al.
8,900,458 B2  12/2014  Tateishi
(Continued)

FOREIGN PATENT DOCUMENTS

CN  101547735 B   7/2012
CN  104220149 A  12/2014
(Continued)

OTHER PUBLICATIONS

Pall (2016) Instructions for Use: Cadence™ Single-Use Tangential Flow Filtration (TFF) Modules with Omega™ Membrane. (Year: 2016).*
(Continued)

*Primary Examiner* — Allison G Fitzsimmons
(74) *Attorney, Agent, or Firm* — EMD Millipore Corporation

(57) ABSTRACT

Processes and systems for filtering a liquid sample are provided. Batches of a liquid sample can be routed to two or more cycling tanks (e.g., first and second cycling tanks). Upon filling a first cycling tank, a first batch of the liquid sample can be routed to a filtration assembly by a continuous diafiltration process that includes routing produced retentate back to the first cycling tank or to a collection vessel. Upon filling a second cycling tank, a second batch of the liquid
(Continued)

sample is routed to the filtration assembly by a continuous diafiltration process that includes routing produced retentate back to the second cycling tank or to the collection vessel. The filling and continuous diafiltration of batches of the liquid sample continues to alternate between the two or more cycling tanks until a total product volume is processed.

5 Claims, 28 Drawing Sheets

(51) Int. Cl.
  *B01D 61/14* (2006.01)
  *B01D 61/22* (2006.01)
  *B01D 65/02* (2006.01)

(52) U.S. Cl.
  CPC ...... *B01D 2311/04* (2013.01); *B01D 2311/08* (2013.01); *B01D 2311/25* (2013.01); *B01D 2313/18* (2013.01); *B01D 2313/243* (2013.01); *B01D 2313/50* (2013.01); *B01D 2315/10* (2013.01); *B01D 2315/14* (2013.01); *B01D 2315/16* (2013.01); *B01D 2317/022* (2013.01); *B01D 2317/04* (2013.01); *B01D 2321/16* (2013.01)

(58) Field of Classification Search
  CPC ............ B01D 2311/08; B01D 2311/25; B01D 2313/18; B01D 2313/243; B01D 2313/50; B01D 2313/10; B01D 2313/14; B01D 2313/16; B01D 2317/022; B01D 2317/04; B01D 2321/16; B01D 46/005; B01D 2315/10; B01D 25/00; B01D 29/00; B01D 29/01; B01D 29/05; B01D 36/00; B01D 37/00; B01D 37/04; B01D 61/00; B01D 61/14; B01D 61/145; B01D 63/00; B01D 63/08; B01D 65/00; B01D 65/08
  See application file for complete search history.

(56) References Cited

U.S. PATENT DOCUMENTS

| | | | |
|---|---|---|---|
| 9,821,274 B1* | 11/2017 | de los Reyes | ......... B01D 61/18 |
| 2009/0173690 A1 | 7/2009 | Oklejas, Jr. | |
| 2010/0101997 A1 | 4/2010 | Tateishi | |
| 2011/0309018 A1 | 12/2011 | Kopf et al. | |
| 2015/0041395 A1 | 2/2015 | Oranth et al. | |

FOREIGN PATENT DOCUMENTS

| | | |
|---|---|---|
| CN | 105745009 A | 7/2016 |
| EP | 2644259 A1 | 10/2013 |
| JP | 2000-126767 A | 5/2000 |
| JP | 2008-229559 A | 10/2008 |
| KR | 10-2016-0045800 A | 4/2016 |

OTHER PUBLICATIONS

Office Action received for Chinese Patent Application No. 201880068067.5 dated Mar. 22, 2022, 7 pages (3 pages of English Translation & 4 pages of Official Copy).
Office Action received for Japanese Patent Application No. 2020-522302 dated Apr. 19, 2022, 4 pages (2 pages of official copy & 2 pages of English translation).
Office Action received for Korean Patent Application No. 10-2022-7011789, dated Jul. 11, 2022, 5 Pages (2 Pages of English Translation and 3 Pages of Official Copy).
International Search Report and Written Opinion received for PCT Application No. PCT/US2018/058660, dated Feb. 13, 2019, 12 pages.
Office Action received for European Patent Application No. 18804820.1 dated Nov. 4, 2021, 9 pages.
Lutz H., "2.06—Ultrafiltration: Fundamentals and Engineering", Comprehensive Membrane Science and Engineering, vol. 2, 2010, pp. 115-139.
Communication Pursuant to Article 94(3) EPC received for European Patent Application No. 18804820.1 dated Jan. 23, 2023, 7 Pages.

* cited by examiner

| Variables | Cycle 1 | Cycle 2 | Cycle 3 | Cycle 4 |
|---|---|---|---|---|
| DF Time (min) | 32.4 | 31.5 | 33.0 | 30.7 |
| DF Volume (L) | 1520 | 1519 | 1525 | 1525 |
| Permeate Volume (ml) | 1611 | 1593 | 1614 | 1611 |
| System hold up | 90 | 74 | 89 | 86 |
| Permeate Flux (LMH) | 13.6 | 13.8 | 13.3 | 14.3 |
| Feed Flux (LMH) | 60 | 60 | 60 | 60 |
| Feed Flux (lmm) | 1 | 1 | 1 | 1 |
| Conversion | 23% | 23% | 22% | 24% |
| Average TMP (psi) | 13.4 | 12.5 | 12.8 | 14.5 |

FIG. 13

| Cycle Number | Feed | | Product recovery (tank + buffer recovery) | | Tank residual | | Yield (%) | Buffer Flush | | Permeate | | Mass balance |
|---|---|---|---|---|---|---|---|---|---|---|---|---|
| | Volume (ml) | Concentration (g/L) | Volume (ml) | Concentration (g/L) | Volume (ml) | Concentration (g/L) | | Volume (ml) | Concentration (g/L) | Volume (ml) | Concentration (g/L) | |
| 1 | 195.8 | 73.1 | 295.4 | 47.0 | NA | NA | 98.5% | 197.6 | 0.21 | 1610.6 | 0.02 | 99.0% |
| 2 | 195.5 | 73.1 | 296.1 | 47.1 | NA | NA | 99.0% | 198.3 | 0.27 | 1593.1 | 0.03 | 99.8% |
| 3 | 196.7 | 73.1 | 296.1 | 47.9 | 2 | 110.7 | 98.6% | 193.8 | 0.20 | 1613.8 | 0.02 | 99.1% |
| 4 | 196.2 | 73.1 | 294.9 | 48.0 | 2 | 104 | 98.7% | 195.9 | 0.19 | 1610.7 | 0.03 | 99.2% |

FIG. 14

CONTINUOUS DIAFILTRATION BY MEANS OF TANK CYCLING

RELATED APPLICATIONS

The present application is a US National Stage application of International Application No. PCT/US2018/058660, filed Nov. 1, 2018, which claims the benefit of priority of U.S. Provisional Patent Application No. 62/585,132, filed date Nov. 13, 2017, the entire content of each of which is incorporated herein in its entirety.

BACKGROUND

Diafiltration typically involves the removal of salts and, optionally, other low molecular weight species from a bioproduction sample in which a target molecule, such as a protein, peptide, nucleic acid, or antibody, resides. Other uses for diafiltration include purification where the product can reside in either the retentate or the permeate (or both). While diafiltration can be performed at several stages throughout a bioproduction process, it is frequently performed as a final step in such processes to exchange a buffer species and to modify the pH and/or conductivity of a final product pool containing the target molecule.

During diafiltration, alternating and/or concurrent concentration and dilution steps "wash" salts out of the sample. Diafiltration is typically performed as a batch operation (i.e., batch diafiltration), in which a sample volume undergoes several iterations of passing through a filtration assembly, with a retentate stream from the filtration assembly being recirculated back to a feed tank and fresh buffer solution being introduced to the feed tank to replace the solvent lost during filtration. The repeated filtration of the sample continues until final processing conditions are met, at which point the product is recovered from the system. Alternatively, a sample volume can travel through a series of single-pass filtration assemblies (i.e., in-line diafiltration), with buffer solution being introduced between each stage of filtration. By performing diafiltration with a series of single-pass filtration stages, the inflow and outflow of the sample to and from the diafiltration system can be continuous.

SUMMARY

Diafiltration methods and systems are provided in which a continuous inflow and outflow of a bioproduction sample (alternatively referred to as a "product") can be achieved with use of batch filtration processes and assemblies. Such methods and systems can provide for continuous production, while requiring less membrane area and/or buffer volume than that typically required for in-line diafiltration.

In one embodiment, the invention relates to a process for filtering a liquid sample comprising routing a first batch of a liquid sample from a sample container (or feed source) to a first cycling tank. Upon filling the first cycling tank, the first batch is routed from the first cycling tank to a diafiltration assembly by a continuous diafiltration process that includes routing retentate produced by the diafiltration of the first batch of the liquid sample back to the first cycling tank or to a concentration filtration assembly or a vessel for product recovery. The process further includes routing a second batch of the liquid sample from the sample container or feed source to a second cycling tank while the first batch undergoes diafiltration. Upon filling the second cycling tank, the second batch of the liquid sample is routed from the second cycling tank to the diafiltration assembly by the continuous diafiltration process, which further includes routing retentate produced by continuous diafiltration of the second batch of the liquid sample back to the second cycling tank or to the concentration filtration assembly or vessel for product recovery. The filling and continuous diafiltration of batches of the liquid sample, and emptying of the liquid sample, continues to alternate between the first and second cycling tanks until a total product volume is processed.

In all embodiments, the continuous diafiltration process includes a tangential flow filtration (TFF) step. The continuous diafiltration process can be, for example, a constant volume diafiltration process or an optimum volume diafiltration process. Additionally, one could employ discontinuous diafiltration, which uses a series of alternating concentration and dilution steps to effect the buffer exchange.

In further embodiments, the liquid sample can be concentrated prior to being delivered to the first or second cycling tanks, such as by a single-pass tangential flow filtration (SPTFF) process. The process can optionally further include alternately routing the retentate from the first and second batches of liquid sample to a holding tank prior to delivering the retentate to a subsequent concentration filtration assembly. The retentate produced by diafiltration of each batch can alternately be filtered by the concentration filter assembly, such as by single-pass tangential flow filtration (SPTFF), until a total product volume is recovered. The process can further include cleaning one of the first and second cycling tanks during the continuous diafiltration process at the other of the first and second cycling tanks. The filtration assembly can be cleaned and/or flushed during the filling of the first or second diafiltration tank.

In yet further embodiments, the process includes routing a third batch of the liquid sample from the sample container to a third cycling tank and alternating the filling and continuous diafiltration of batches of the liquid sample among the first, second, and third cycling tanks until a total product volume is recovered. The third batch of the liquid sample can be routed from the third cycling tank to a second diafiltration assembly by a continuous diafiltration process that includes routing retentate produced by continuous diafiltration of the third batch to the liquid sample back to the third cycling tank or to a concentration filtration assembly or vessel for product recovery. The two diafiltration assemblies can be configured to operate in parallel.

In another embodiment, the invention relates to a system for filtering a liquid sample comprising first and second cycling tanks, a first valve configured to direct a flow of a liquid sample to the first or second cycling tank, a continuous diafiltration (CDF) assembly, a second valve configured to direct a flow of the liquid sample to the CDF assembly from the first or second cycling tank, a diafiltration pump, and a third valve configured to direct a flow of buffer solution to retentate of the CDF assembly returning to the first or second cycling tank. The system can further include a controller configured to toggle the first valve to alternately direct the liquid sample to one of the first and second cycling tanks while toggling the second and third valves to direct liquid sample to the CDF assembly from, and buffer solution to the retentate returning to, the other of the first and second cycling tanks through a continuous diafiltration process.

In some embodiments, the CDF assembly comprises a tangential flow filtration (TFF) assembly. The system can further include a single-pass tangential flow filtration (SPTFF) assembly upstream of the first and second diafiltration tanks and/or downstream of the first and second diafiltration tanks to concentrate a sample prior to and/or following diafiltration. The system can also include a holding tank or means for containing a surge volume upstream or downstream of the first and second diafiltration tanks.

In further embodiments, the system comprises a third cycling tank, wherein the controller is further configured to cycle batches of the liquid sample among the first, second, and third cycling tanks in the continuous diafiltration process at the CDF assembly. A second CDF assembly configured to operate in parallel with the first CDF assembly can be included. The controller can be further configured to cycle batches of the liquid sample among the first, second, and third cycling tanks in a continuous diafiltration process at both the first and second CDF assemblies. Additional cycling tanks beyond the third cycling tank can be added up to as many cycling tanks as may be practical for the given application. Each cycling tank may be configured to perform a different function (e.g., reaction chemistry or different buffers for diafiltration of impurities) while another cycling tank is undergoing CDF.

In another embodiment, the system comprises a diafiltration buffer tank. The diafiltration pump can be in fluid communication with the diafiltration buffer tank and the first and second cycling tanks, or with a fluid conduit configured to direct retentate to the first and second cycling tanks. The system can further comprise multiple diafiltration buffer tanks which can have the same or different buffer solutions. The controller can be further configured to control a flow of the buffer solution at the diafiltration pump to maintain a setpoint which can be, for example, a flow rate, tank level, tank, weight, or other measurable parameter. The system can also further comprise a feed pump in fluid communication with the first and second cycling tanks and the CDF assembly, wherein the controller is further configured to control a flow of the liquid sample at the feed pump to maintain a setpoint which can be, for example, a flow rate, membrane inlet pressure, membrane pressure drop, or other measurable parameter.

In yet a further embodiment, the fluid contacting flow paths of the system are sterilized or sanitized to create a closed system and comprise sterilized/sanitized assemblies which have been sterilized/sanitized using gamma irradiation, ETO, NaOH or other method, with aseptic connection using tube welding or aseptic connectors, and using sterile filters on the inlet and outlet lines to the continuous diafiltration system for bioburden control

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 13 is a table of cycle variability results of the four continuous diafiltration cycles performed in the experiment described in FIGS. 9-12.

FIG. 14 is a table of yield and mass balance results of the four continuous diafiltration cycles of FIGS. 9-13.

DETAILED DESCRIPTION

Definitions

Figure 1:
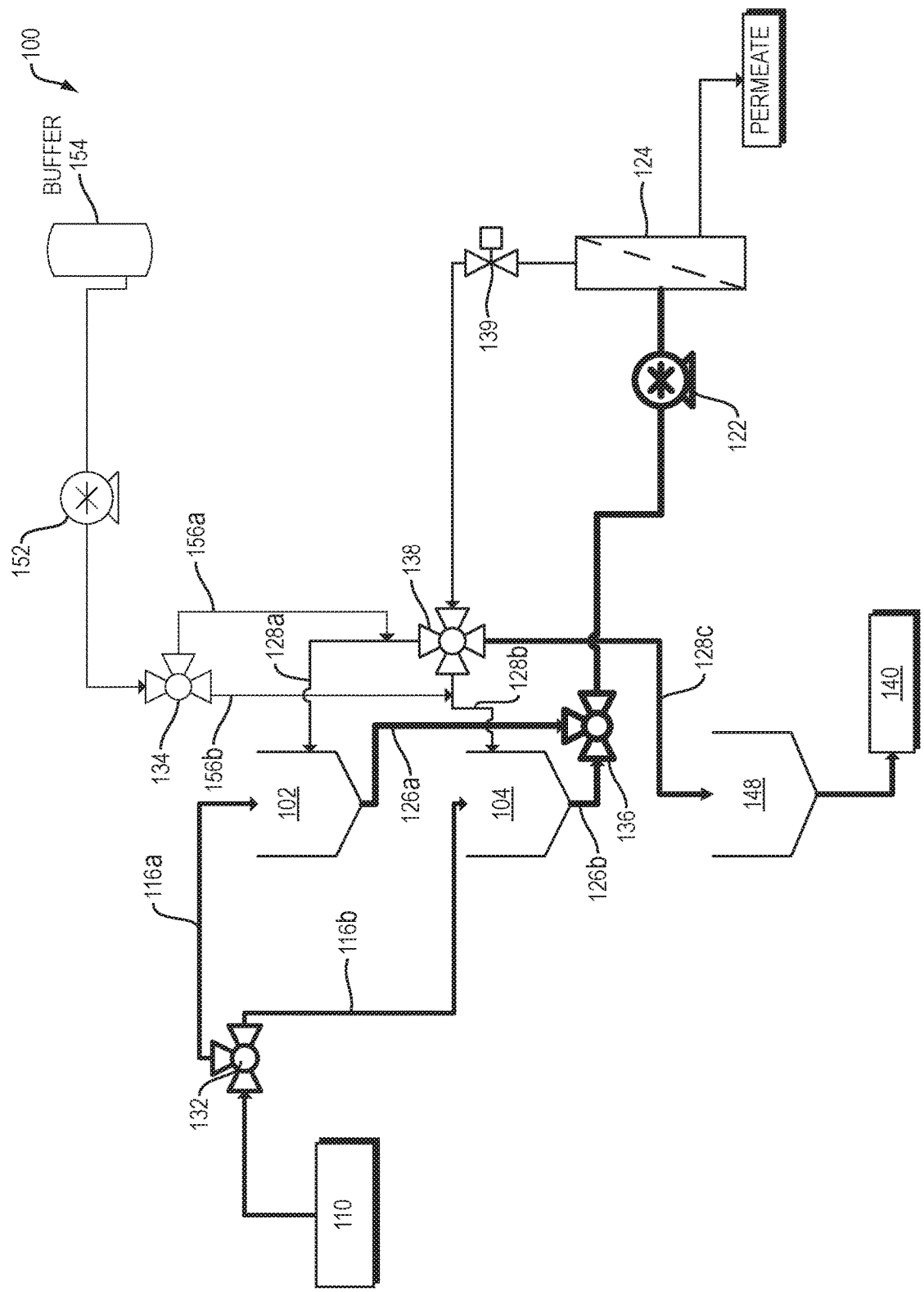
FIG. 1 is a schematic of a continuous diafiltration system of the invention that is comprised of minimal components while still achieving a continuous diafiltration process.

Unless defined otherwise, all technical and scientific terms used herein have the same meaning as commonly understood by one of ordinary skill in the art to which this invention pertains.

As used herein, the singular forms "a", "an," and "the" include plural unless the context clearly dictates otherwise.

"Continuous diafiltration process" or "CDF process" is used herein to refer to a process by which buffer exchange of a liquid sample occurs by adding buffer and removing permeate with minimally uninterrupted inflow and outflow to and from a diafiltration assembly.

"Continuous diafiltration assembly" or "CDF assembly" is used herein to refer to a filtration assembly configured for use in a continuous diafiltration process and containing one or more filtration modules (e.g., a TFF assembly).

"TFF assembly" and "TFF system" are used interchangeably herein to refer to a tangential flow filtration assembly in which fluid travels tangentially along a surface of a filtration membrane in a filtration module of the system.

"SPTFF assembly" and "SPTFF system" are used interchangeably herein to refer to a single pass tangential flow filtration system that is configured for operation in a single-pass mode, where the fluid passes once through the system.

A "filtration assembly" refers to an assembly comprising one or more filtration units or filtration modules, for example (including but not limited to), a cassette, a spiral-wound filter, a capsule, or a hollow-fiber filter. A filtration assembly may include one or more filtration units or filtration modules operating in series or in parallel. Series operation refers to modules where the retentate of the previous module becomes the feed for the subsequent module.

A "cassette" refers to a cartridge or flat plate filter element comprising stacked filtration (e.g., ultrafiltration or microfiltration) membrane sheet(s).

A "spiral-wound filter element" refers to a filter element comprising filtration membrane sheet(s) and, optionally, separator material wound around a central core.

A "capsule" refers to a filtration element comprising a matrix of filtration membrane sheet(s) or filtration material within a holder-less cartridge.

A "hollow-fiber filter element" refers to a filter element comprising a bundle of filtration membrane tubes.

"Filtration membrane" refers to a selectively permeable membrane for separating a feed into a permeate stream and a retentate stream in a filtration process (e.g., a TFF process, a diafiltration process). Filtration membranes include, but are not limited to, ultrafiltration (UF) membranes, microfiltration (MF) membranes, reverse osmosis (RO) membranes and nanofiltration (NF) membranes.

The terms "ultrafiltration membrane" and "UF membrane" are generally defined as a membrane that has pore sizes in the range of between about 1 nanometer to about 100 nanometers, or alternately defined by the "molecular weight cut off" of the membranes, expressed in units of Daltons, and abbreviated as MWCO. In various embodiments, the present invention utilizes ultrafiltration membranes having MWCO ratings in the range from about 1,000 Daltons to a 1,000,000 Daltons.

The term "microfiltration membranes" and "MF membranes" are used herein to refer to membranes that have pore sizes in the range between about 0.1 micrometers to about 10 micrometers.

The terms "feed," "feed sample" and "feed stream" refer to the solution that is delivered (e.g., continuously, as a batch) to a filtration module to be filtered. The feed that is delivered to a filtration module for filtration can be, for example, feed from a feed container (e.g., vessel, tank) external or internal to the system, or retentate flowing in a tube from a preceding filtration module upstream of the diafiltration system.

"Product" refers to a target compound in a feed sample. Typically, a product will be a biomolecule (e.g., protein) of interest, such as a monoclonal antibody (mAb). It can reside in the retentate or permeate or both.

The term "filtration" generally refers to the act of separating the feed sample into two streams, a permeate and a retentate, using membranes.

The terms "permeate" and "filtrate" refer to that portion of the feed that has permeated through the membrane.

The term "retentate" refers to the portion of the solution that has been retained by the membrane, and the retentate is the stream enriched in a retained species.

"Feed line" or "feed channel" refers to a conduit for conveying a feed from a feed source (e.g., a feed container) to one or more processing units in a filtration assembly.

"Retentate line" or "retentate channel" refers to a conduit in a filtration assembly for carrying retentate.

"Permeate line" or "permeate channel" refers to a conduit in a filtration assembly for carrying permeate.

The term "plurality," when used herein to describe processing units, refers to two or more processing units (e.g., two or more filtration units).

"Fluidly connected" refers to two or more components of a filtration assembly that are connected by one or more conduits (e.g., a feed channel, a retentate channel, a permeate channel) such that a liquid can flow from one component to the other.

"Processing" refers to the act of filtering (e.g., by TFF) a feed containing a product of interest and subsequently recovering the product in a concentrated or purified form.

A "cycle tank" or "cycling tank" is used herein to refer to a vessel configured to store a fluid which can be single-use or multi-use and composed of plastic, glass, or metal, for example, and can be capable of receiving or including an internal mixer to mix a held fluid, including, for example, conventional batch tanks, bags, and single-use bags. The cycle tank or cycling tank can also be configured integrally into feed line or feed channel such that it can capture a surge volume of a feed and need not be a separate and distinct component. It is preferred for the tanks described here to demonstrate good mixing in order to achieve performance efficiencies. This can be accomplished for example, by the use of an internal mixer and/or by the design of the tank and retentate flow inlet to assist mixing. Diafiltrate may be added directly to the tank but it is preferred to add it to the retentate line before the combined fluids are introduced to the tank.

A "pump" is used herein to refer to a method or device configured to impart flow such as inducing gravity flow, applying a pressure differential to a fluid, including, for example a magnetic levitation pump, a peristaltic pump, or a diaphragm pump.

"Trans-membrane pressure drop" is the module average pressure drop across a filtration membrane.

"Cross flow" is the retentate flow rate between an inlet and an outlet of a filtration module. Unless otherwise stated, "cross flow" refers to an average cross flow.

"Permeate flux" refers to an area normalized flow rate of permeate in a permeate channel (e.g., Liters/hr/m2, LMH) of a filtration module.

"Cross flow flux" refers to an area normalized average flow rate of retentate in a feed channel (e.g. Liters/min/m2, 1 mm) of a filtration module.

"Valves" refers to methods or assemblies that stop fluid flow and redirect fluid flow through system conduits. This may include physically moving tubes between tanks in open systems, "pinching" tubes, on-off valves, control valves and multiport valves.

A description of example embodiments follows.

Diafiltration Systems and Methods for Continuous Production

In the biopharmaceutical industry, diafiltration is traditionally performed as a batch process in which a sample undergoes several iterations of filtration, with buffer exchange occurring gradually over the several iterations. Traditional batch diafiltration is an inherently discontinuous production process, as inflow and outflow of the product to and from the diafiltration system halts while the sample undergoes the several iterations of filtration. As the biopharmaceutical industry moves towards continuous processing for several of its unit operations (e.g., perfusion production and harvest, flow-through chromatography, single-pass concentration), there is a need for diafiltration methods and systems that are capable of providing continuous inflow and outflow of a product. While in-line diafiltration can provide for continuous inflow and outflow of a product, such systems require undesirably large membrane areas and buffer volumes and become very difficult to operate in a cGMP environment to balance multiple flows. There is a need for diafiltration systems and methods that can perform diafiltration in a continuous production process that do not require undesirably large membrane areas and buffer volumes and are easy-to-operate.

Conventional batch diafiltration is typically run for only a few hours to minimize protein degradation through multiple pump passes, manage bioburden, and balance the batch production line to time allow for pre- and post-processing operating steps. The use of cycling allows for continuous operation to the balance production line, longer utilization of membrane for reduced area requirements, and enables compact systems with sterile or sanitized components to manage bioburden, without adding significant complexity.

In methods and systems of the present invention, batch diafiltration can be performed as a core operation to effect buffer exchange, with the operation cycling between feed samples provided by two or more cycling tanks. As such, multiple aliquots of an overall batch volume are provided for diafiltration, resulting in continuous inflow and outflow of a product to and from the diafiltration system. Such diafiltration systems can be placed between any process or unit operation that exists either upstream or downstream, for example between SPTFF, reaction, chromatography, clarification and/or virus filtration unit operations. Multiple such diafiltration systems can be run in series or in parallel and can include bound products such as chromatography beads, cell substrates, or adsorbing polymers where products are sequentially adsorbed, washed, eluted, and regenerated in a series of successive steps done using membranes to facilitate the separation and retention.

An example of a diafiltration system 100 is shown in FIG. 1 and includes first and second cycling tanks, 102, 104 and a continuous diafiltration assembly 124. Each of the cycling tanks 102, 104 is connected to a sample container 110 by fluid conduits 116a, 116b. The sample container 110 can be any vessel configured to store or route a sample from an upstream location. The sample container 110 can also be a length of fluid conduit configured in size to hold a larger volume that is connected to an upstream process.

The diafiltration system 100 further includes valves 132, 134, 136, and 138. Sample valve 132 can be toggled to control a flow of the sample through either of fluid conduits 116a, 116b such that the sample is routed to either the first cycling tank 102 or the second cycling tank 104. Buffer valve 134 can be toggled to control a flow of buffer solution from a buffer container 154 and a diafiltration pump 152 through either of fluid conduits 156a, 156b such that the buffer solution is delivered to either the first cycling tank 102 or the second cycling tank 104. Feed valve 136 can be toggled to control a flow of sample solution from either the first or second cycling tanks 102, 104, through fluid conduits 126a, 126b, to the continuous diafiltration assembly 124. Lastly, retentate valve 138 can be toggled to direct a flow of retentate exiting the continuous diafiltration assembly 124 through either of fluid conduits 128a, 128b to return to cycling tanks 102, 104 or through fluid conduit 128c to exit the system, optionally being stored in a holding tank 148 prior to passing to the product container 140. The product container 140 can be a final filling step where the retentate is captured in a final form for use by an end user. Optionally, a retentate pressure control valve 139 is located between the continuous filtration assembly 124 and the retentate valve 138.

Figure 2:
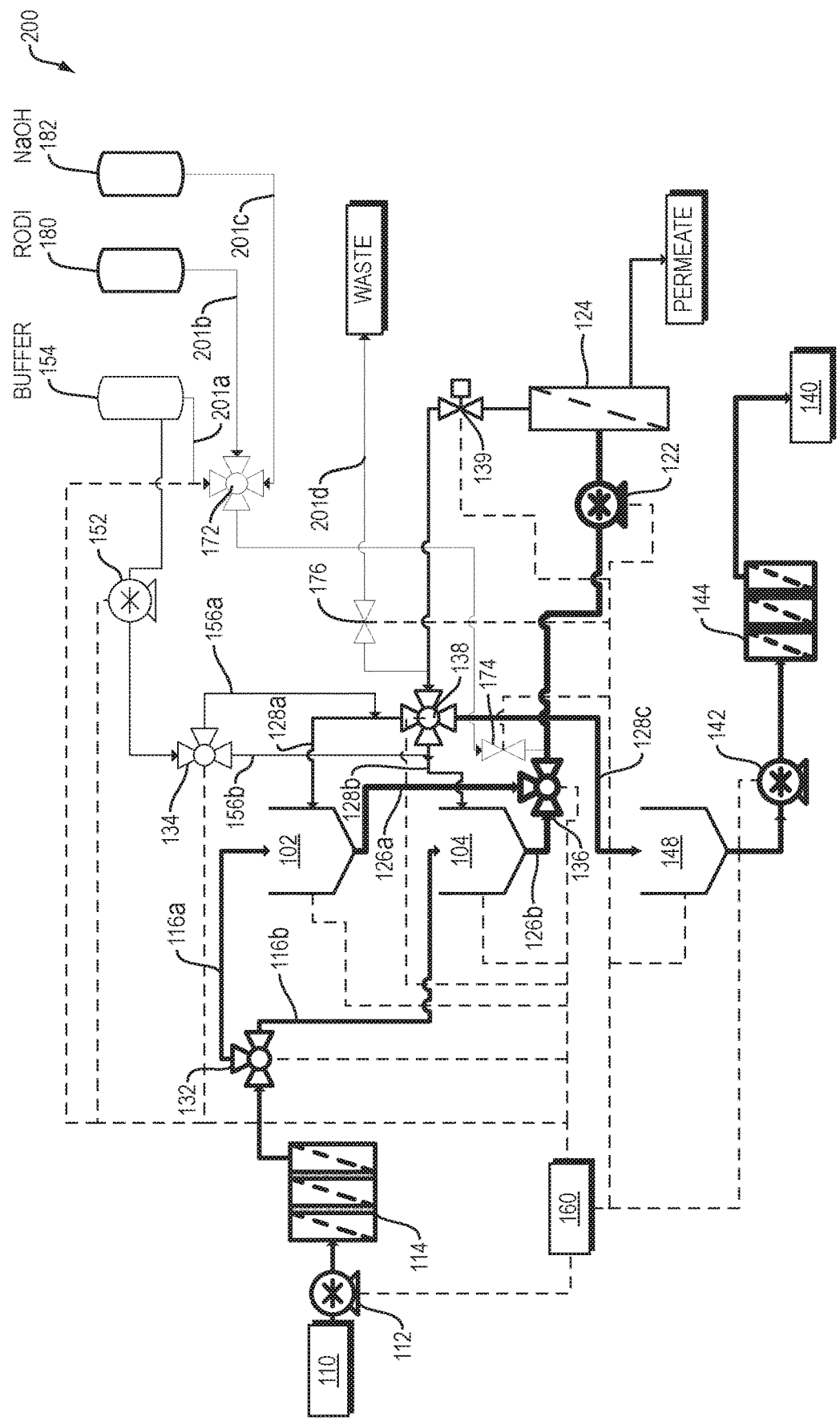
FIG. 2 is a schematic of another example of a continuous diafiltration system of the invention that includes extra equipment for flushing and cleaning operations and also provides an example of how a SPTFF unit operation can be placed both prior to and after the continuous diafiltration.

Another example of a diafiltration system 200 is shown in FIG. 2 having all of the components as FIG. 1. Additionally, in this example, a first filtration pump 112 and a first filtration assembly 114 are optionally located between the sample container 110 and the cycling tanks 102, 104. A second filtration pump 142 and second filtration assembly 144 are optionally located downstream of the cycling tanks 102, 104, between the tanks 102, 104 and the product container 140.

Pre-diafiltration preparation and post-diafiltration cleaning components can optionally be included in the system 200. For example with regard to pre-diafiltration preparation, containers 180, 182 for storing water (e.g., reverse osmosis deionized (RODI) water) and regeneration solutions (e.g., detergents, enzymes, acids, bases, etc) are in fluid communication with a first cleaning valve 172, which selectively directs the flow of buffer and regeneration solutions to the continuous filtration assembly 124. Second and third cleaning valves 174, 176 can also be included to direct flow of cleaning solutions to and from the continuous filtration assembly 124.

The valves 132, 134, 136, and 138 are optionally connected to a controller 160, as shown by the dashed lines in FIG. 2. The controller 160 can be configured to toggle the valves 132, 134, 136, and 138 as described further below. The controller 160 can also control operation of any of the first and second filtration pumps 112, 142, feed pump 122, diafiltration pump 152, and retentate pressure control valve 139. The controller 160 can also optionally control cleaning components, including cleaning valves 172, 174, 176. Connections to the controller 160 from the first and second filtration pumps 112, 142, feed pump 122, diafiltration pump 152, retentate pressure control valve 139, and cleaning valves 172, 174, 176 are also indicated in dashed lines in FIG. 2. Controller 160 can further monitor a diafiltration process by receiving information from sensors located on components of the device that provide, for example, pressure, weight, volume, flow, time, and/or concentration readings of the sample. For example, weight sensors can be included in the cycling tanks 102, 104, or in the holding tank 148; sensors located at or near valves 132, 134, 136, 138, 172, 174, 176 can provide pressure, flow rate, and/or fluid volume readings. For clarity with regard to the diagram of FIG. 1, such sensors and their respective connections to controller 160 are not shown, but it should be understood that sensors can be located at or near any component of the system, including fluid conduits located between components. Controller 160 can be configured to control the initiation of diafiltration, buffer addition rate and volume, recovery flush times, and other processes of the system, including cleaning, flushing, integrity testing, and regeneration processes.

The configuration of valves 132, 134, 136, and 138, which can be switching valves or multiport valves, allow for a main product flow to be cycled between filling, diafiltration, and product recovery operations, while the diafiltration assembly 124 is operated continuously.

Figure 3A:
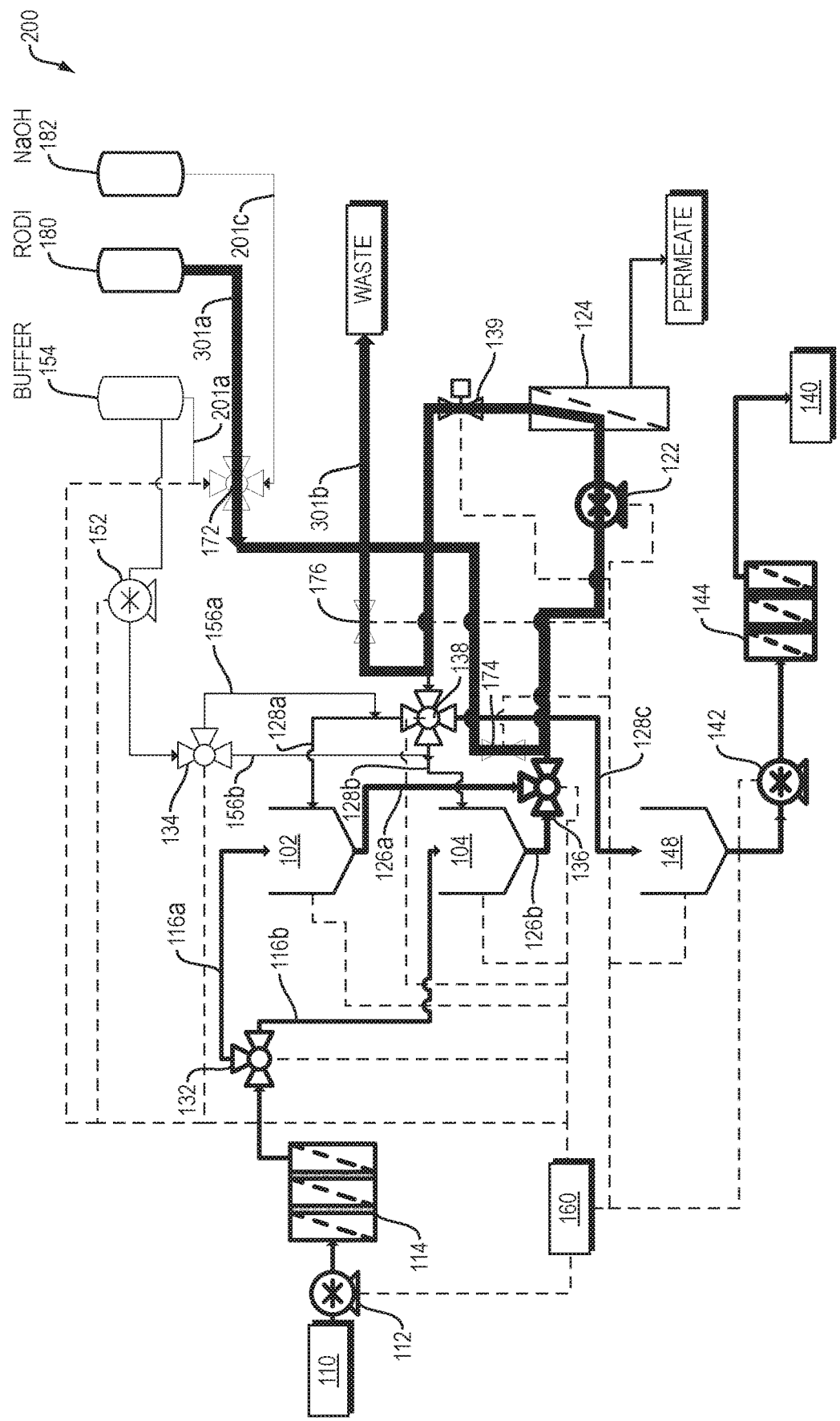
FIGS. 3A-3N illustrate steps of a continuous diafiltration process in the system of FIG. 2.
Figure 3B:
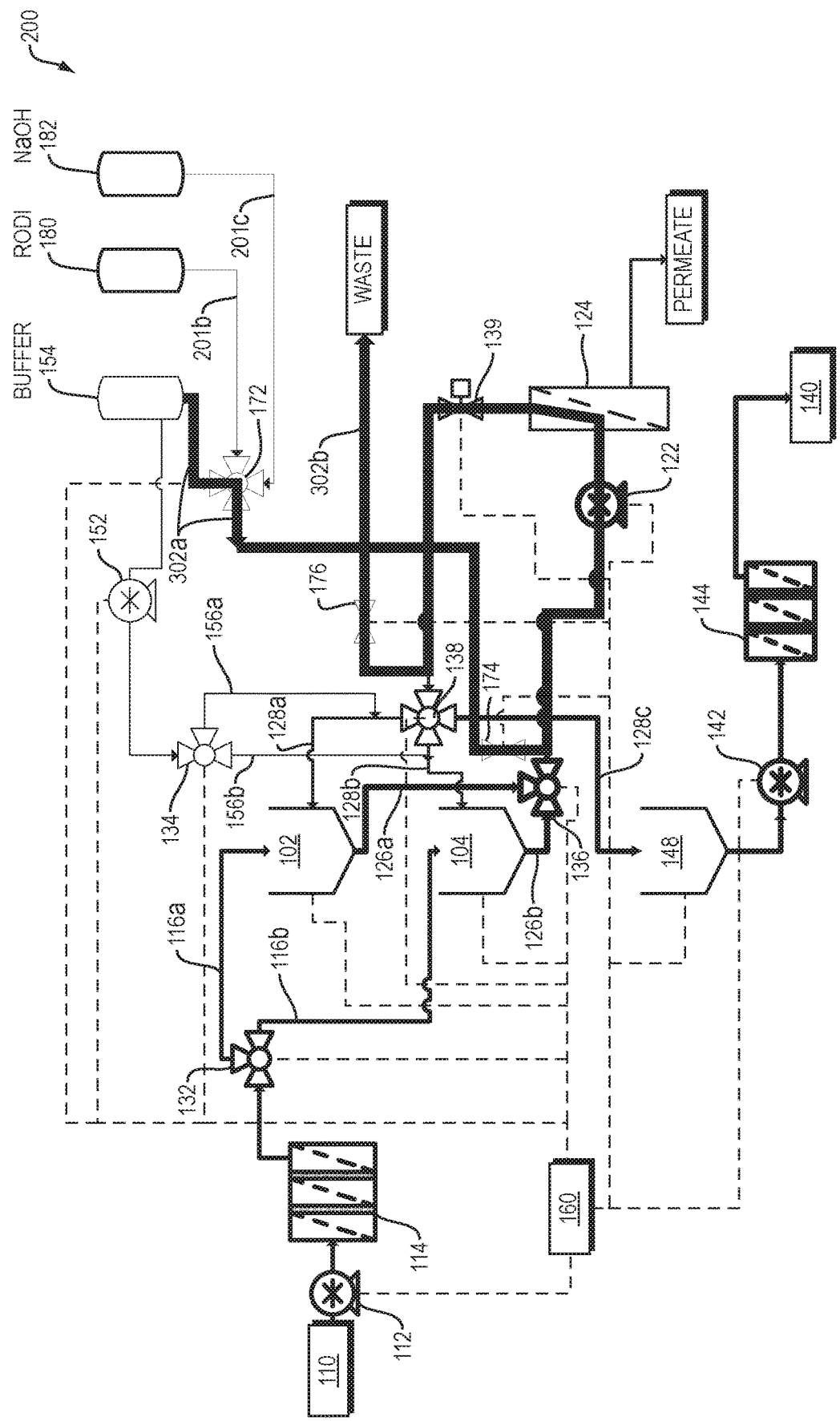
Figure 3C:
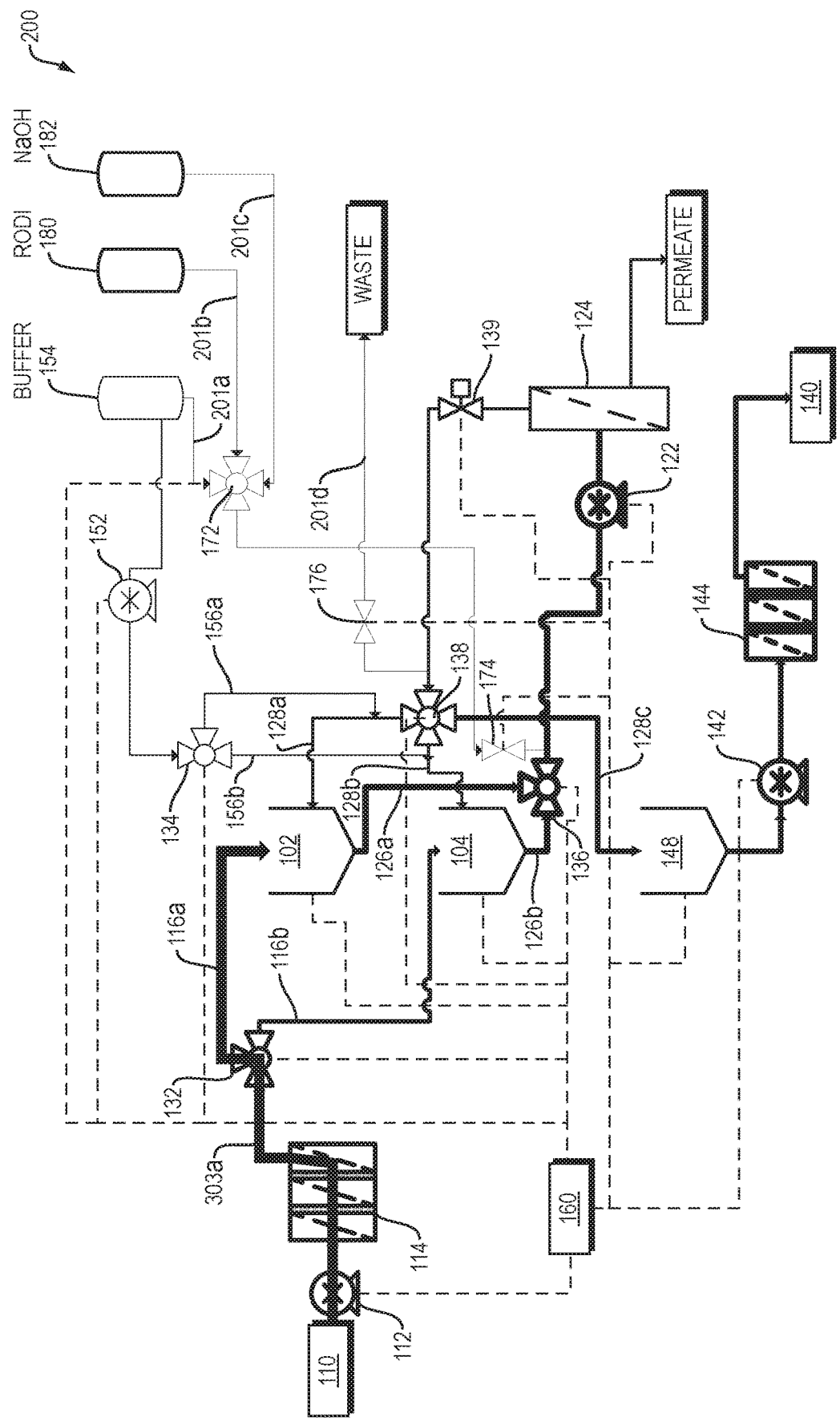
Figure 3D:
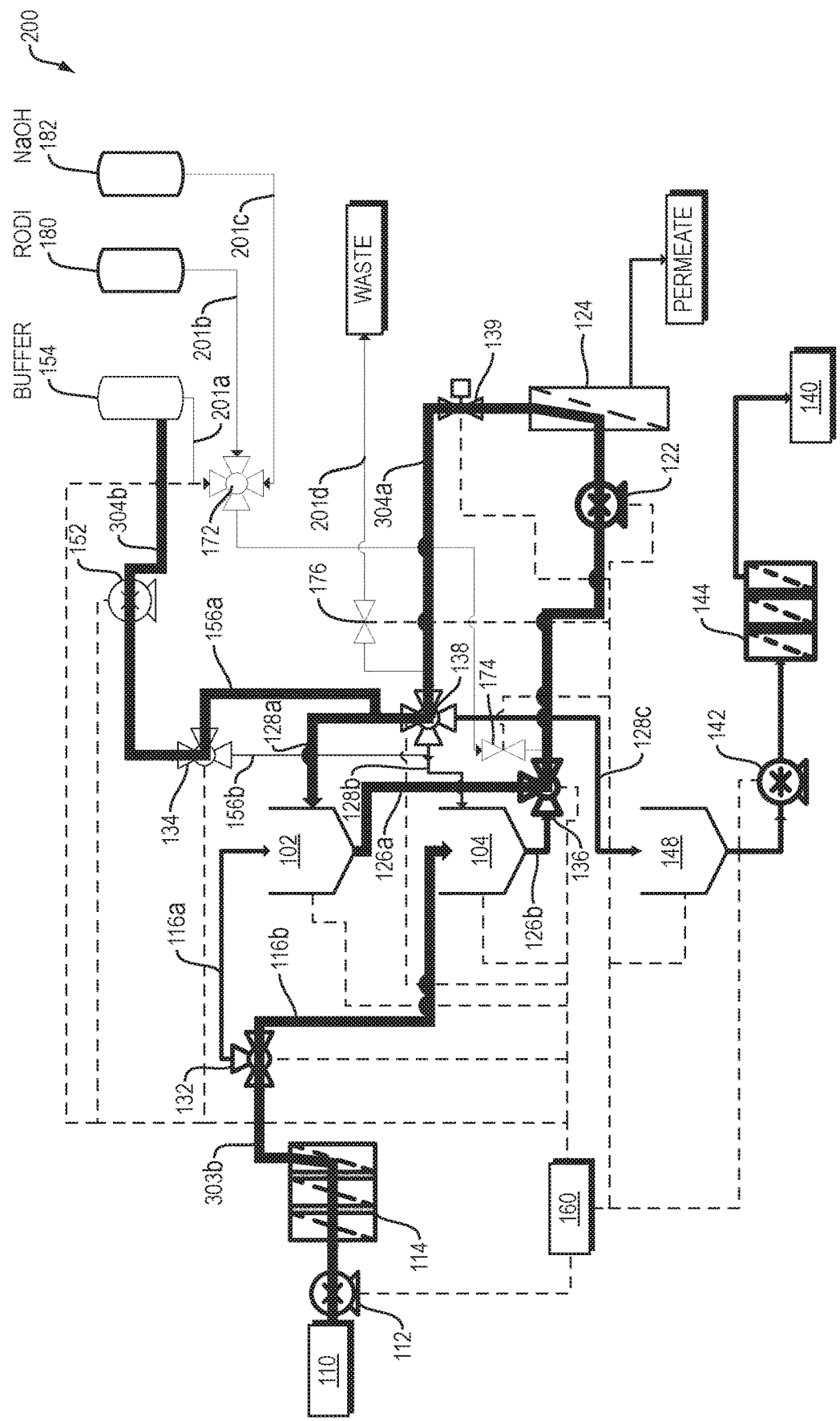
Figure 3E:
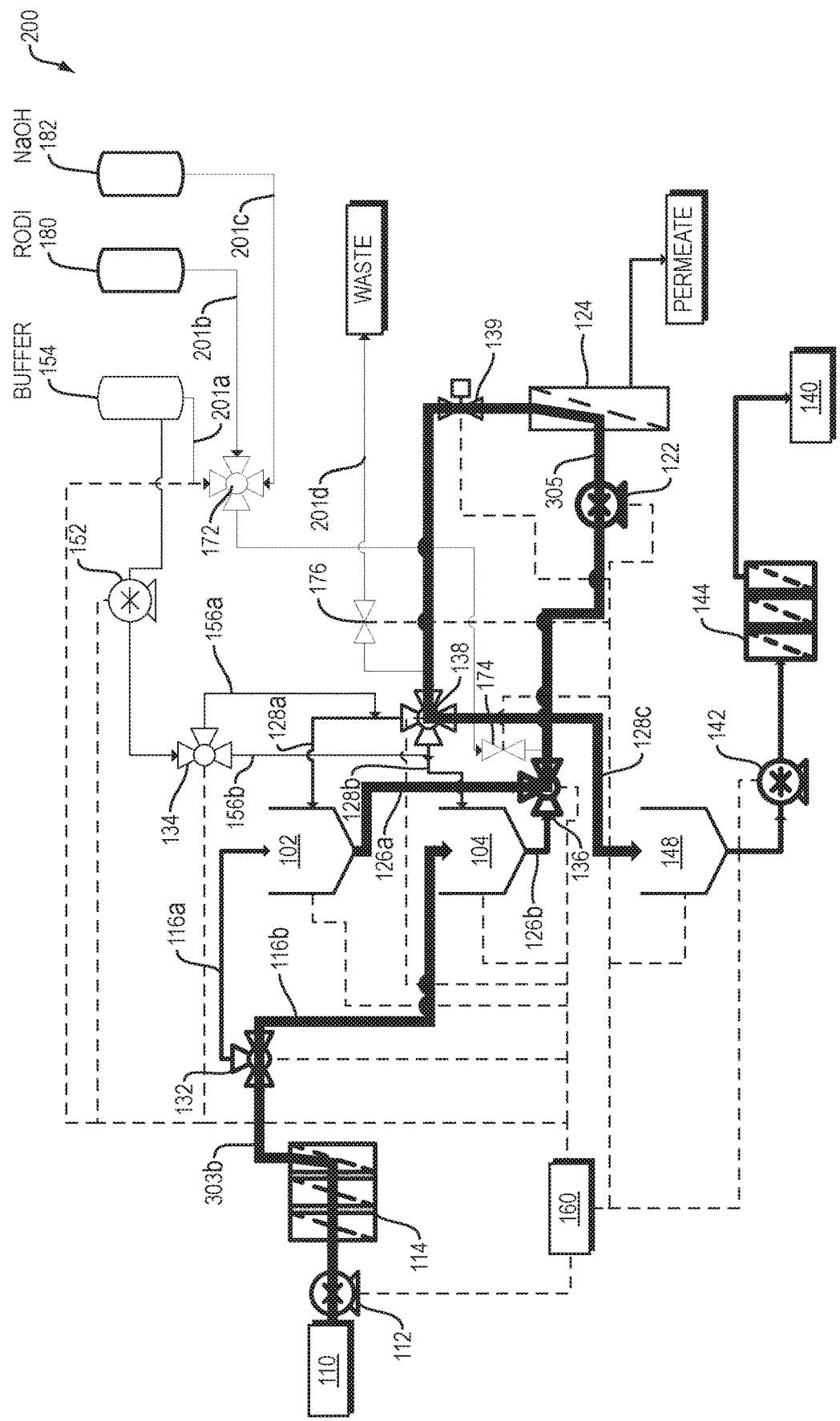
Figure 3F:
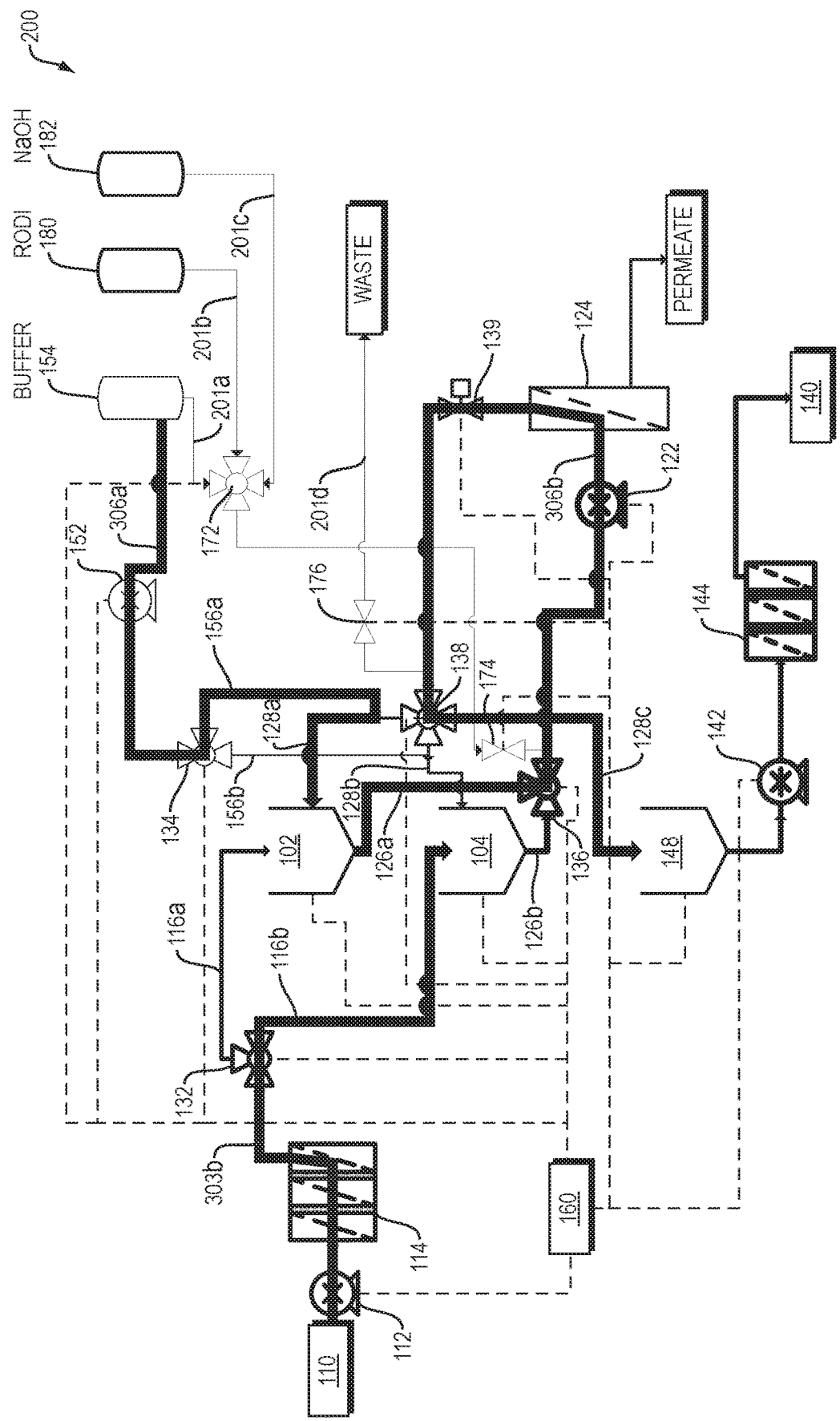
Figure 3G:
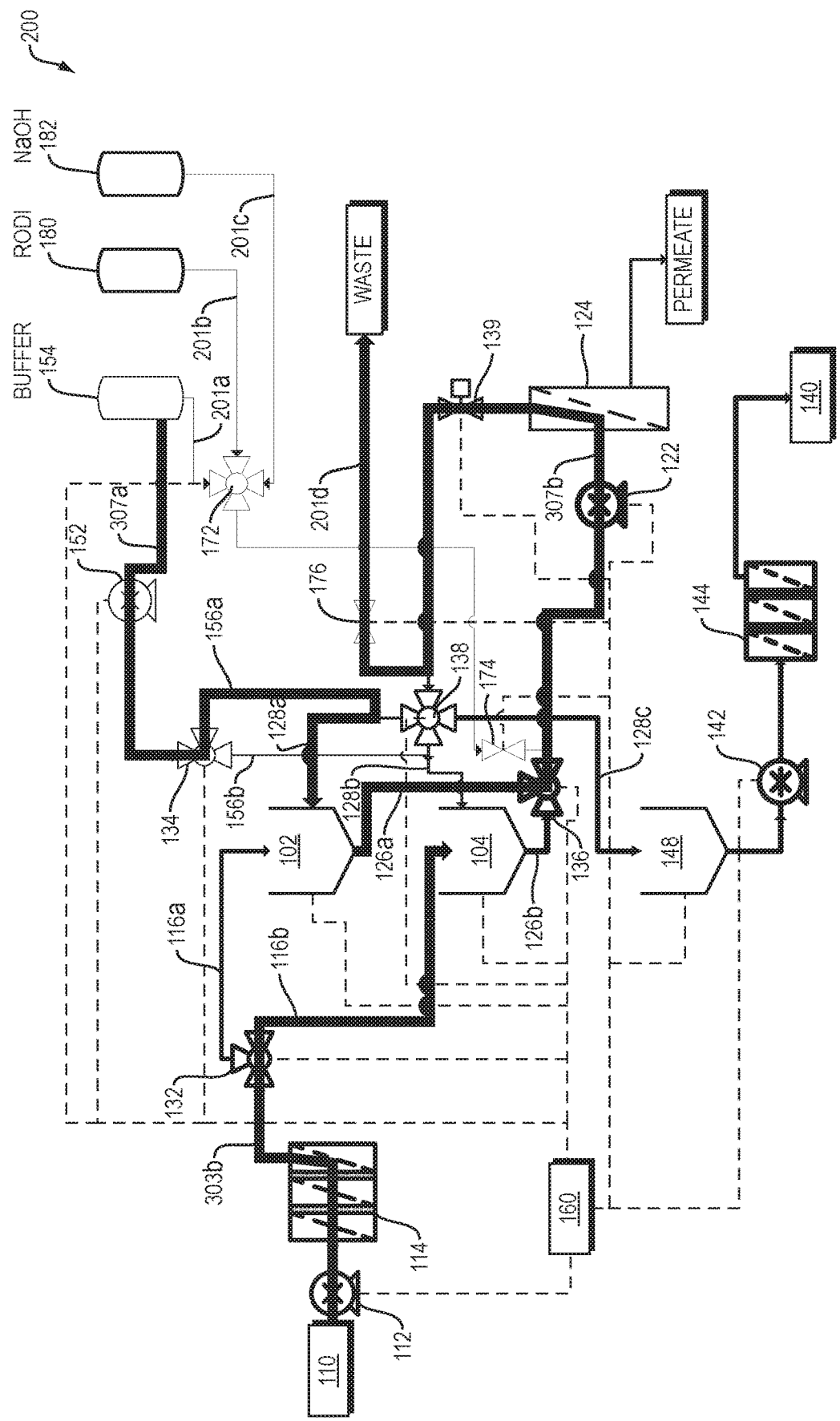
Figure 3H:
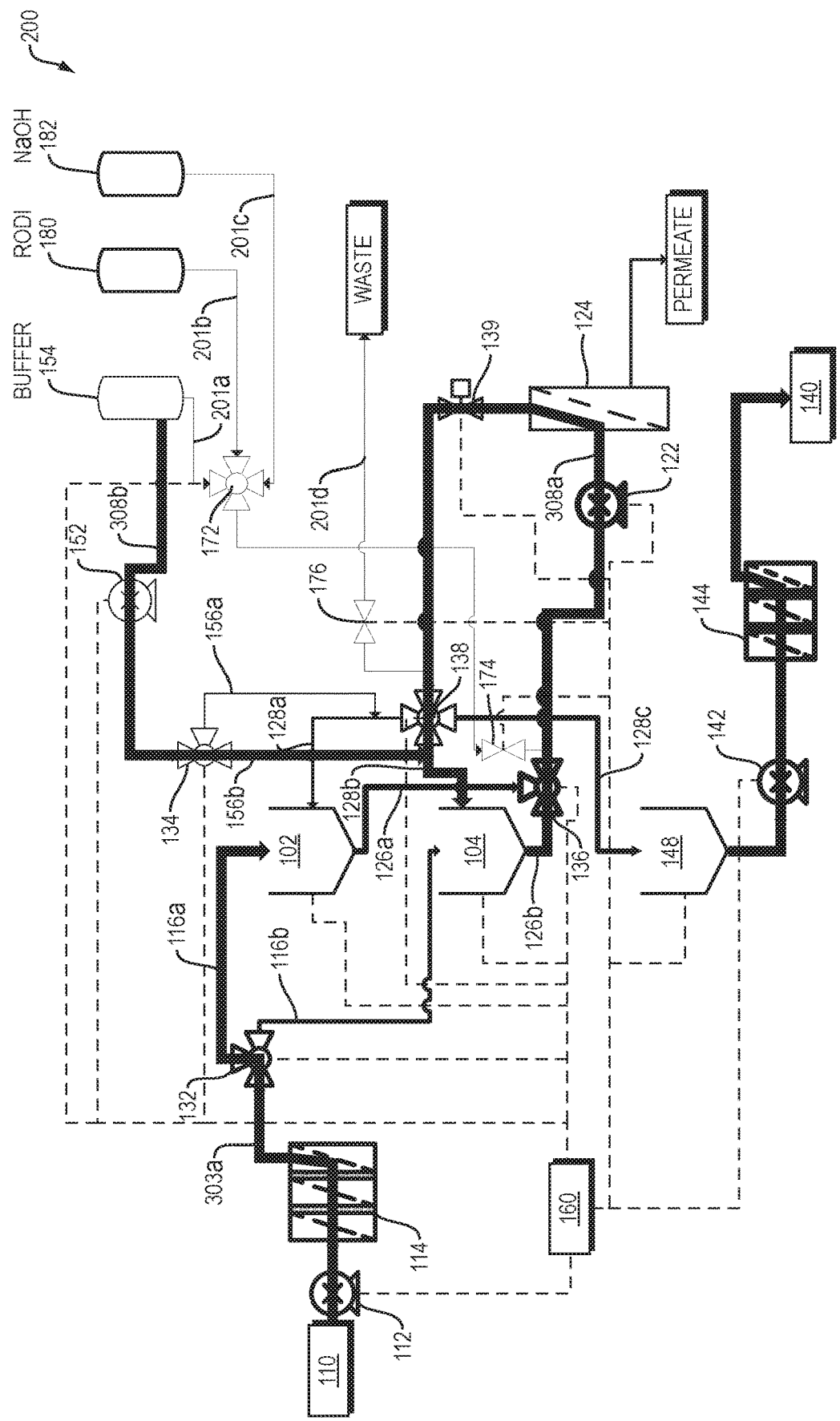
Figure 3I:
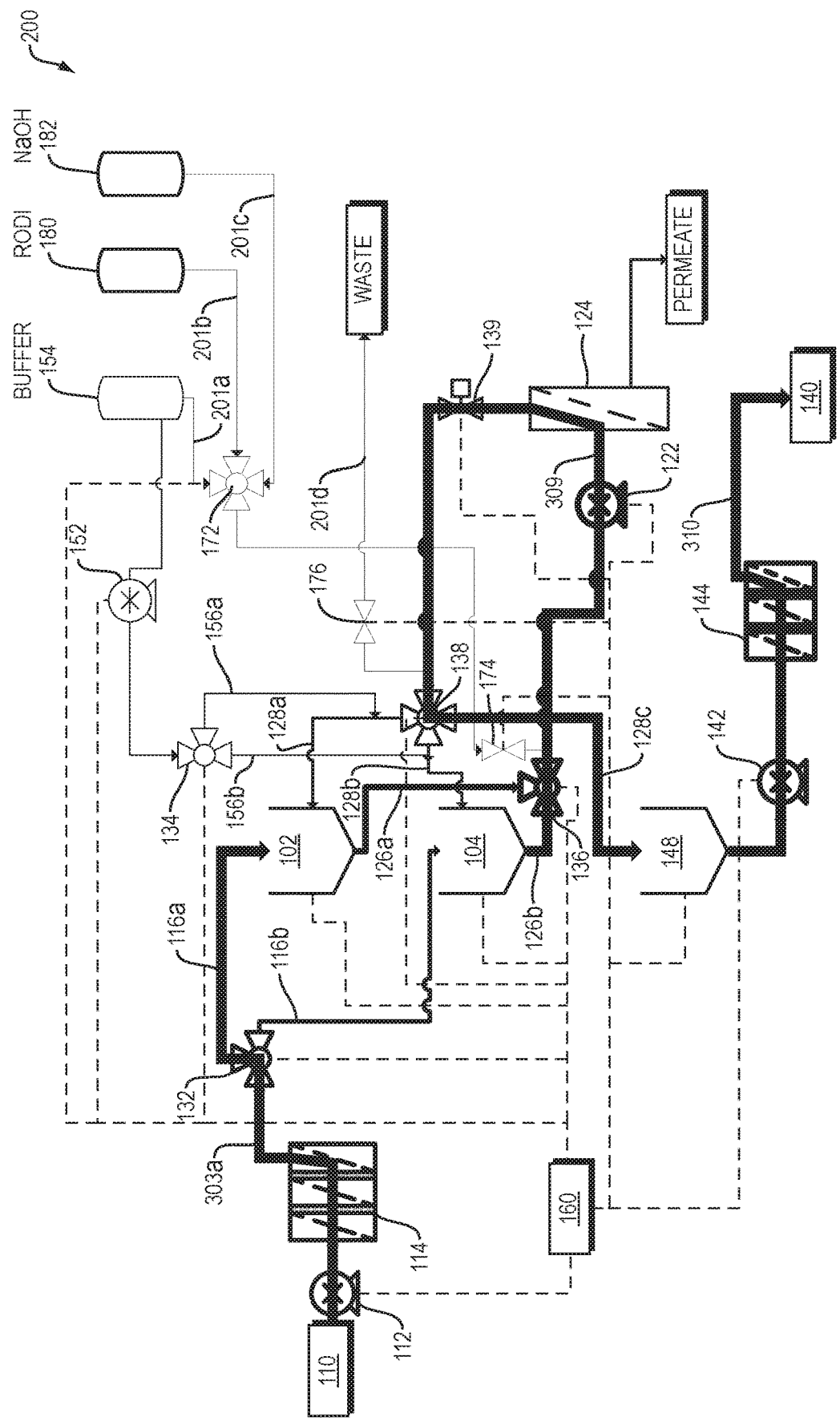
Figure 3J:
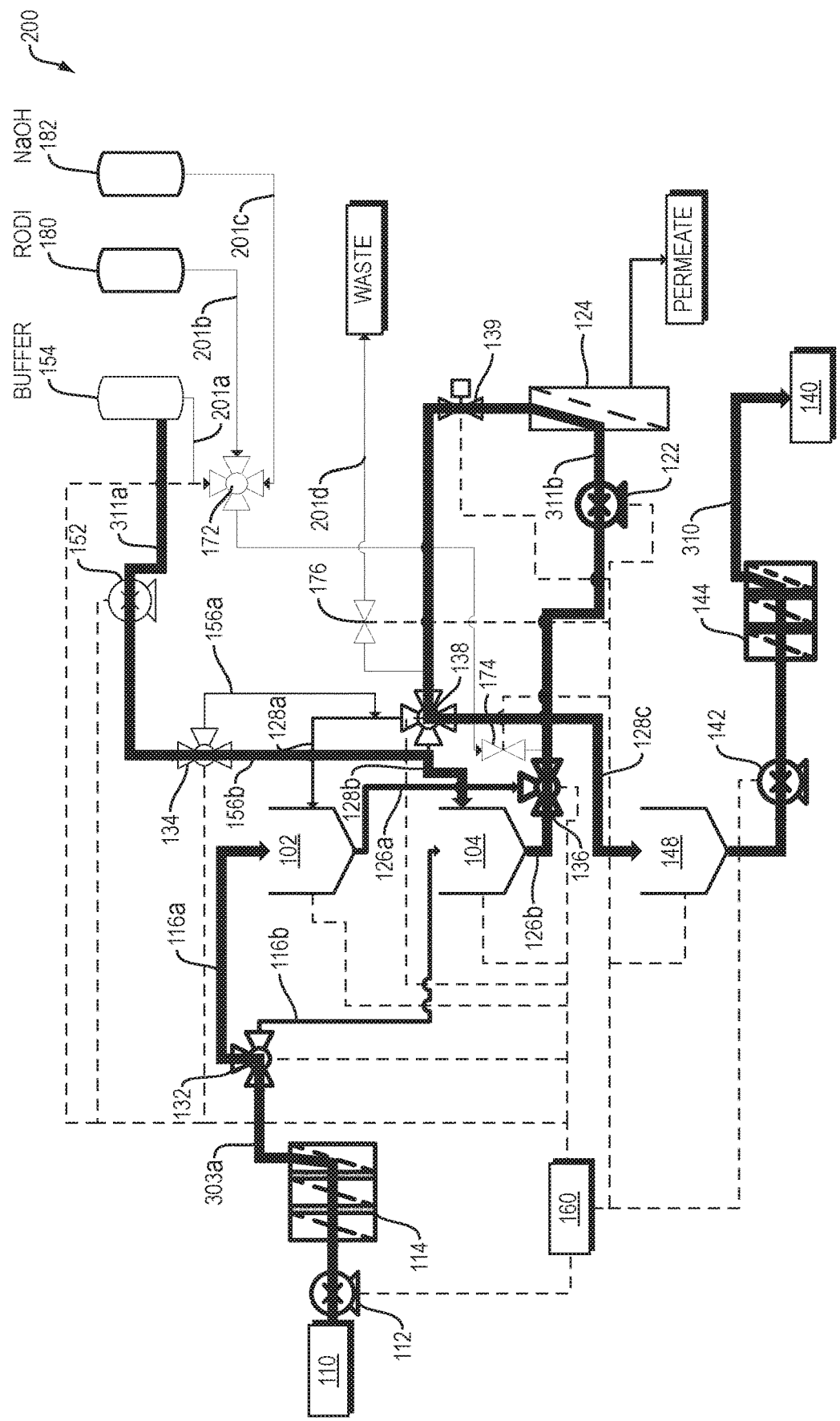
Figure 3K:
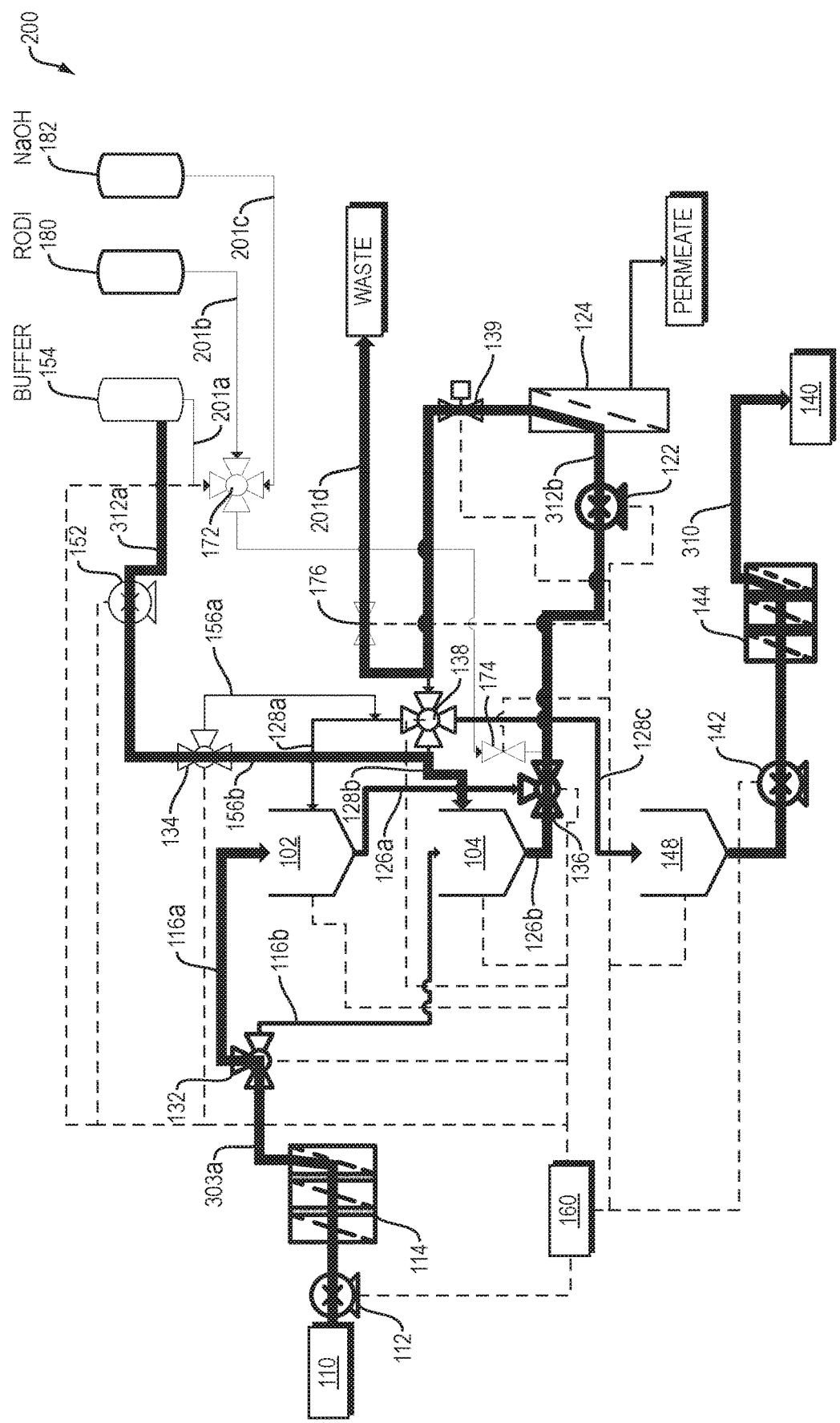
Figure 3L:
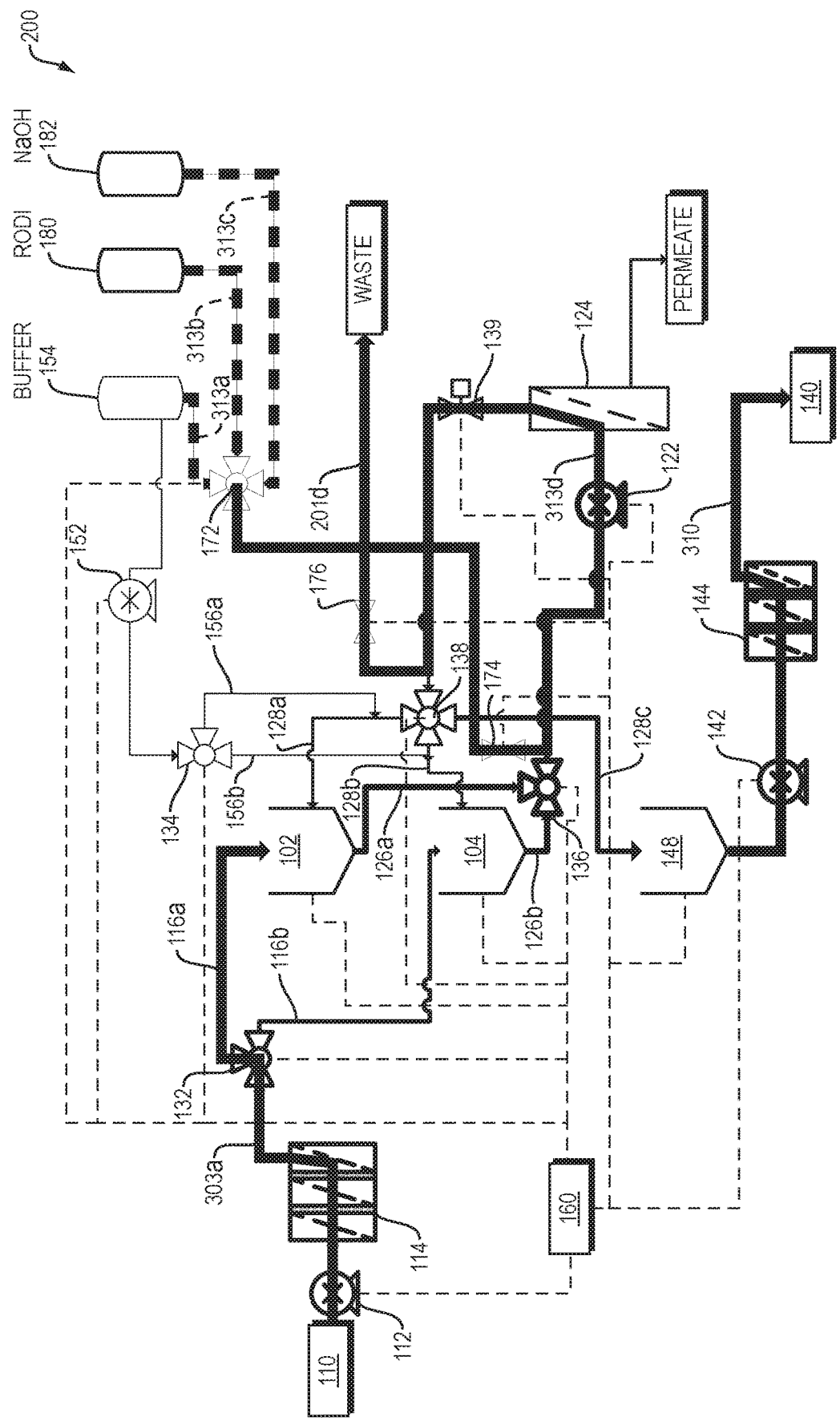
Figure 3M:
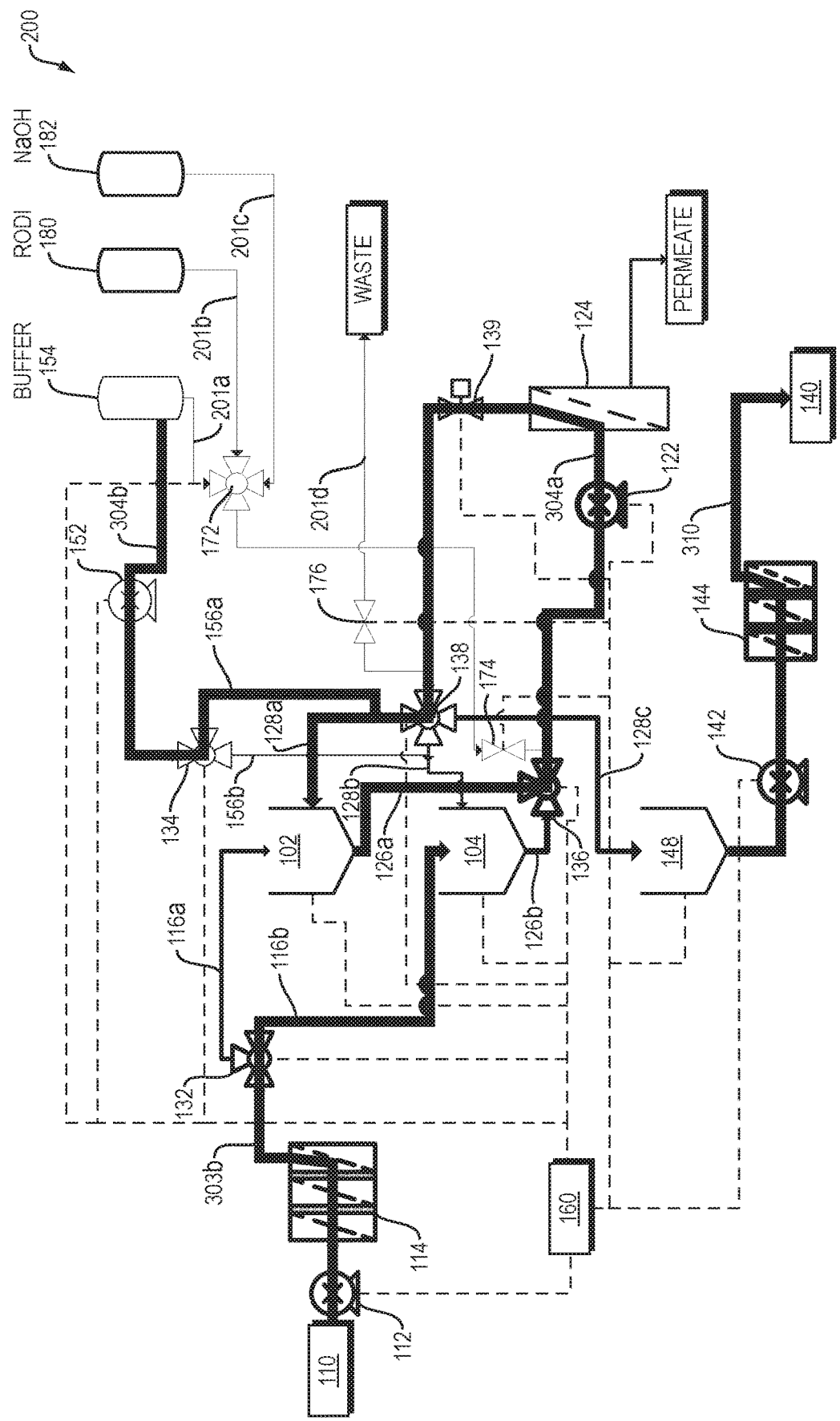
Figure 3N:
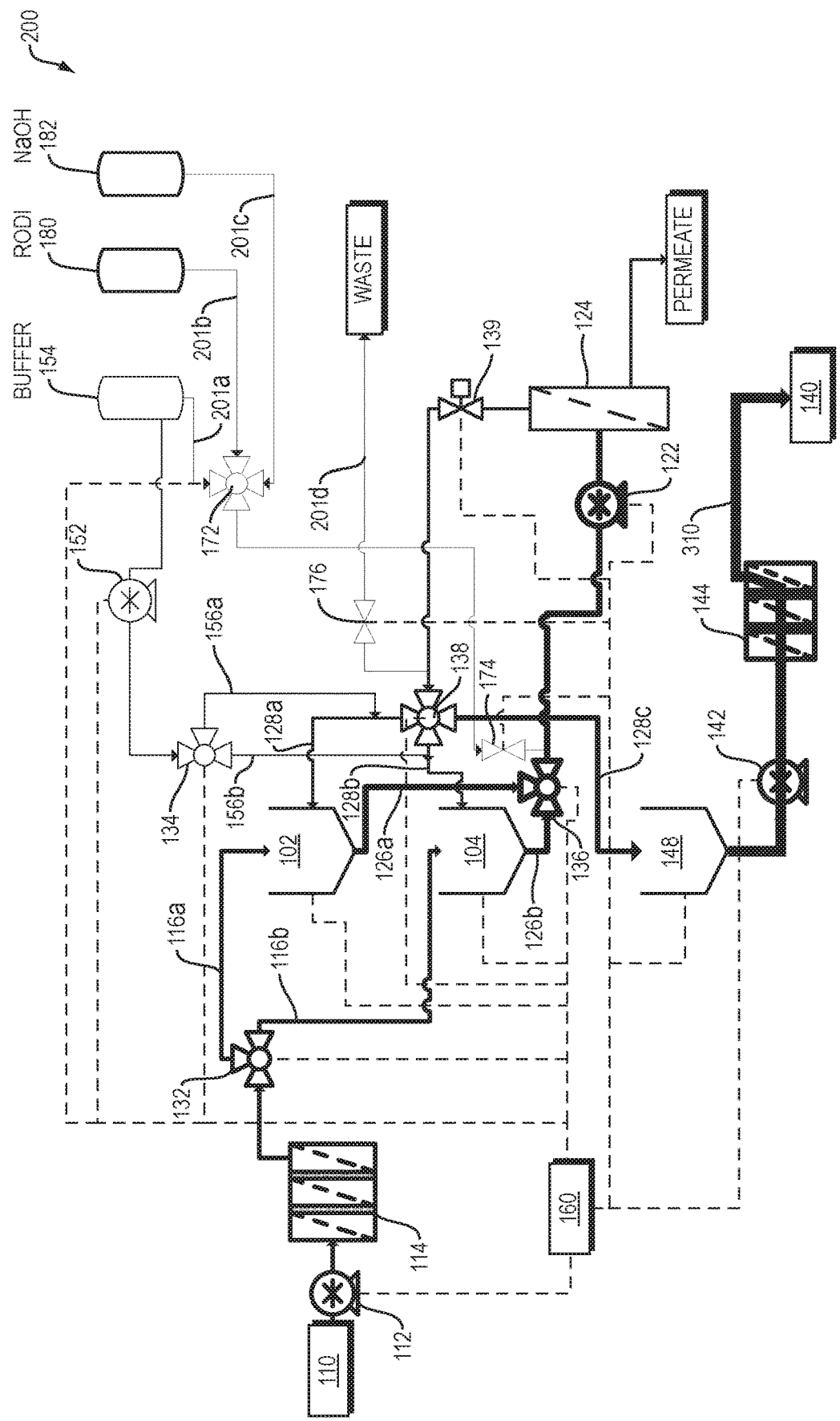

FIGS. 3A-3N illustrate an example of a continuous diafiltration process using the system 200 of FIG. 2. Optionally, an initial pre-use membrane flush operation can be performed, as illustrated by bolded arrows 301a, 301b (FIG. 3A). In particular, the first, second, and third cleaning valves 172, 174, 176 are toggled to direct a flow of water from the container 180 through the continuous filtration assembly 124. With the retentate valve 138 closed along fluid conduits 128a, 128b, 128c and the cleaning valve 176 open, the water is directed to exit the system 200 following the membrane flush. Additionally, an optional pre-use membrane equilibration operation can be performed prior to diafiltration, as illustrated by bolded arrows 302a, 302b (FIG. 3B). In particular, the first, second, and third cleaning valves 172, 174, 176 are toggled to direct a flow of buffer solution from container 154 through the continuous filtration assembly 124.

Upon initiation of the diafiltration process, valve 132 is toggled to direct a flow of the product from the sample container 110 to the first cycling tank 102, as shown by bolded arrow 303a (FIG. 3C). Optionally, a flow of buffer solution can be introduced to the first cycling tank prior to or at the same time as filling of the tank with sample solution. A concentration step can optionally be performed by the first filtration assembly 114 to concentrate the sample prior to diafiltration. As will be appreciated from FIGS. 3C-3N, upon initiation of the diafiltration process, inflow to the diafiltration system 200 can remain continuous until the sample approaches completion of processing.

Once the first cycling tank 102 contains a volume sufficient for diafiltration of a first batch of the sample to begin, valve 132 is toggled to change the direction of flow of the sample to the second cycling tank 103, as shown by bolded arrow 303b (FIG. 3D), while diafiltration of the first batch begins. In particular, valves 136 and 138 are toggled to route flow of the first batch of sample to and from the diafiltration assembly 124 and the first cycle tank 102, as shown by bolded arrow 304a. During diafiltration of the first batch, valve 134 is toggled to direct the buffer solution to the first cycling tank 102, or to a fluid conduit leading to the first cycling tank, as shown by bolded arrow 304b. As will be appreciated from FIGS. 3D-3N, upon initiation of diafiltration, the diafiltration assembly 124 can remain in continuous operation until the sample approaches completion of processing.

Once processing conditions have been met for the first batch of sample, the sample is routed to the holding tank 148, as shown by bolded arrow 305 (FIG. 3E), for storage until product recovery is to commence. Holding tank 148, and any subsequent filtration of the sample by filtration assembly 144, is optional. The sample can alternatively be routed by a fluid conduit directly to a next processing or recovery stage. As the product of the first batch of sample is routed to the holding tank 148, flow of the sample to the system 200 continues to the second cycling tank 104, as shown by bolded arrow 303b. Recovery of the product of the first batch of the sample can optionally include a buffer flush, as shown by bolded arrows 306a, 306b (FIG. 3F), and as is described further below.

Between diafiltration of sample batches, cycling tank 102 can optionally be purged, as shown by bolded arrows 307a, 307b (FIG. 3G), described further below.

Once the second cycling tank 104 contains a volume sufficient for diafiltration of a second batch of the sample to begin, valve 132 is toggled to revert the direction of flow of the sample back to the first cycling tank 102, as shown by bolded arrow 303a (FIG. 3H), while diafiltration of the second batch begins. In particular valves 136 and 138 are toggled to route flow of the second batch of sample to and from the diafiltration assembly 124 and the second cycle tank 102, as shown by bolded arrow 308a. During diafiltration of the second batch, valve 134 is toggled to direct the buffer solution to the second cycling tank 104, or to a fluid conduit leading to the first cycling tank, as shown by bolded arrow 308b.

Once processing conditions have been met for the second batch of sample, the sample is routed to the holding tank 148, as shown by bolded arrow 309 (FIG. 3I), for storage until further product recovery steps commence.

Once holding tank 148 contains a volume sufficient for product recovery to begin, flow of the sample is routed from holding tank 148, through the second filtration pump 142 and second filtration assembly 144, to the container 140, as shown by bolded arrow 310 (FIG. 3I). As will be appreciated from FIGS. 3I-3N, upon initiation of product recovery from holding tank 148, outflow from the diafiltration system 200 can remain continuous until the sample completes processing.

As with the first batch of sample, recovery of the product of the second batch of the sample can optionally include a buffer flush, as shown by bolded arrows 311a, 311b (FIG. 3J). Between diafiltration of sample batches, cycling tank 104 can optionally be purged, as shown by bolded arrows 312a, 312b (FIG. 3K).

Optionally, a rapid membrane regeneration process can be performed between diafiltration of sample batches, as shown by bolded arrows 313a-313d (FIG. 3L) in which the diafiltration assembly 124 is flushed and/or backflushed with buffer, water, and/or regeneration solution. Such regeneration process can occur without interruption of inflow and outflow from the system, as an inflow of sample can continue to be routed to one of the cycling tanks (for example, to the first cycling tank 102, as shown by bolded arrow 303a in FIG. 3L) and an outflow of sample can continue to be routed away from holding tank 148 (as shown by bolded arrow 310).

Once diafiltration of the second batch of sample completes, as well as any optional buffer flushing or regeneration processes, diafiltration of a third batch of sample begins, with the sample being routed from, and buffer solution routed to, the first cycling tank 102, as shown by bolded arrows 304a, 304b (FIG. 3M). The system continues alternating the filling and continuous diafiltration of batches of the sample between cycle tanks 102 and 104. During such cycling, diafiltration assembly 124 can be in continuous operation. Additionally, inflow and outflow to and from the system (as shown by bolded arrows 303a, 303b, and 310) can also be continuous.

Once diafiltration of all batches of the sample approaches completion, inflow to the system and operation of filtration assembly 124 may cease, while recovery of the product is allowed to complete, as shown in FIG. 3N.

Figure 4:
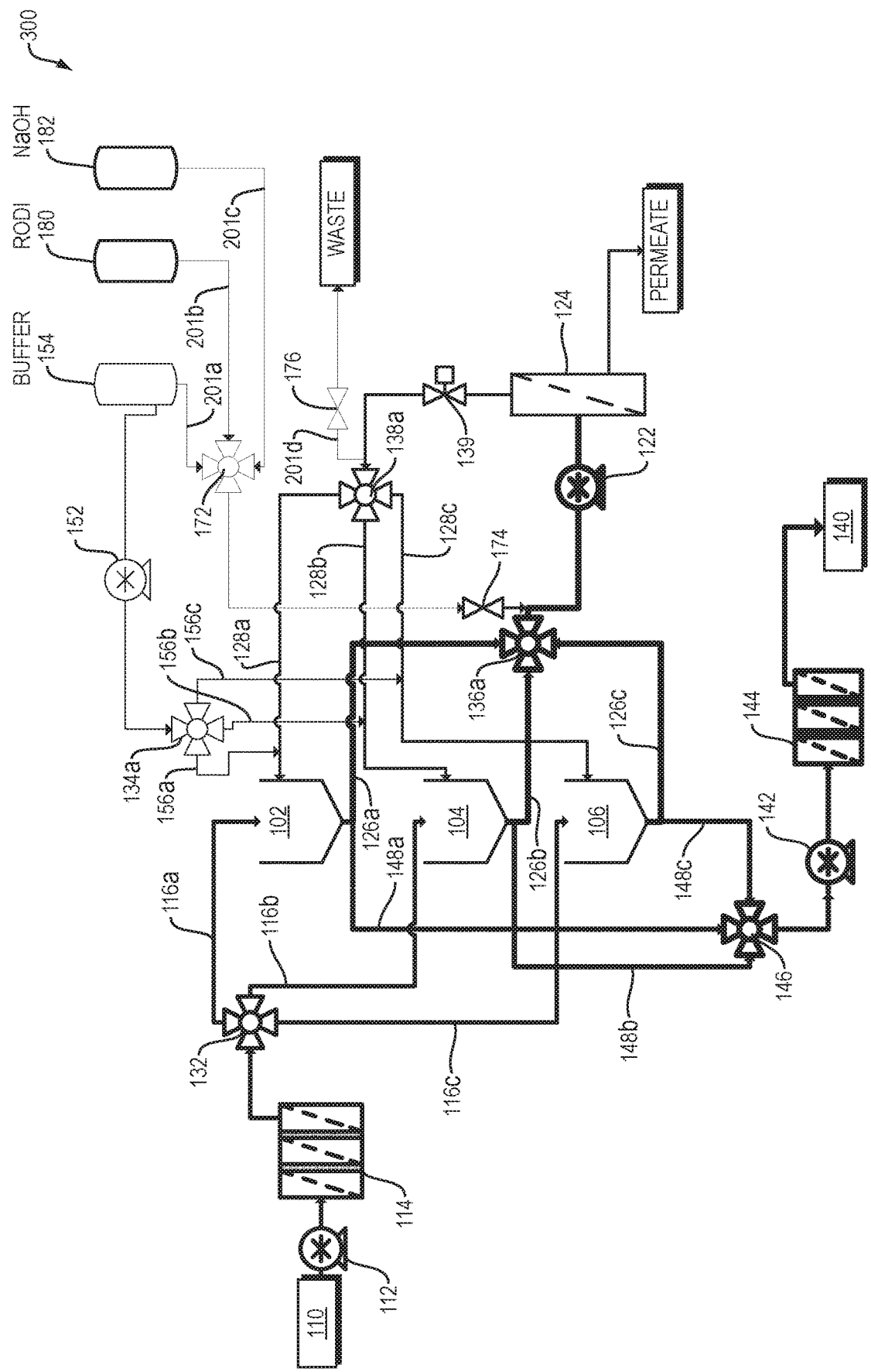
FIG. 4 is a schematic of another example of a continuous diafiltration system that includes a third cycling tank.

While the diafiltration systems 100 and 200 are shown to include two cycling tanks 102, 104 and one holding tank 148, other configurations are possible. For example, three, four, five, or more cycling tanks can be included in a system. Additionally, as noted above, the inclusion of a holding tank is optional. An alternative configuration of a diafiltration system is shown in FIG. 4. Diafiltration system 300 includes a third cycling tank 106. Valves 134a, 136a, and 138a are configured to route, respectively, a buffer stream, a feed stream, and a retentate stream to/from any of the three cycle tanks 102, 104, and 106. The system 300 further includes an outlet valve 146 configured to control a flow of sample out of any of the three cycle tanks 102, 104, and 106. As such, any of cycle tanks 102, 104 and 106 can store a batch of sample either prior to or following diafiltration, and diafiltration processes can cycle among the three tanks.

Systems 100, 200, 300 can further optionally include additional diafiltration assemblies, such that, in addition to cycling between tanks, diafiltration processes can be operated in parallel and/or cycled among the diafiltration assemblies.

In one embodiment, systems of the present invention encompass continuous diafiltration assemblies that are tangential flow filtration (TFF) assemblies. TFF assemblies can include cassettes, spiral-wound filter elements, capsules, or hollow-fiber filter elements. TFF provides an efficient method for performing buffer exchange while also enabling concentration of a sample in a same unit operation. As such, TFF is advantageous for use in diafiltration processes.

In another embodiment, systems of the present invention include TFF assemblies located upstream and/or downstream of the diafiltration assembly (e.g., filtration assemblies 114 and 144) to concentrate a sample prior to/following diafiltration. Such TFF assemblies can be single-pass TFF assemblies (SPTFF). SPTFF assemblies, and methods of using same following diafiltration, advantageously allow for higher product recoveries to be made through use of buffer flushing processes, as will be described further below. Without a final SPTFF step in a buffer flushing process, the recovered product would be diluted by excess buffer.

In embodiments, diafiltration systems of the present invention include standard bioproduction equipment, such as conventional batch tanks, pumps, and control valves. The systems further include switching valves and/or multiport valves in fluid communication with the cycling tanks and diafiltration assembly to allow a main product flow to be cycled between filling, diafiltration, and product recovery operations while the diafiltration assembly is operated continuously.

Systems and methods of the present invention advantageously allow smaller aliquots of product to undergo diafiltration, while providing for continuous production. By diafiltering smaller aliquots, process time, and hence number of pump passes, can be shorter than typical batch diafiltration processes. It is desirable to limit the number of pump passes of the sample as biomolecules can be damaged while travelling through pumps and filtration equipment, which can result in a lower product yield. Additionally, such systems and methods can be used in-line with other processing operations, while also meeting high-buffer exchange requirements for bioprocessing operations. By breaking up a sample into multiple aliquots, smaller cycle tanks and filtration assemblies may be used, providing for smaller system footprints and smaller cycle times. Furthermore, by sequentially running multiple cycles of product through a continuously-operating diafiltration assembly, idle time between batches, as occurs in traditional batch diafiltration, is eliminated. With continuous operation of a diafiltration assembly, protein loading per membrane area can be increased, such that discarding the membrane at the end of the process, and consequently eliminating cleaning time, cleaning solutions, and re-use and re-validation efforts, becomes more economically viable, particularly for large operations.

In embodiments, adequate time remains at the end of each diafiltration cycle to provide for buffer flushing to recover higher amounts of product (FIGS. 3F, 3J). Buffer flushing can be performed by, for example, introducing a buffer solution, air, or gravity drain to push additional product located at or in the membrane of the diafiltration assembly, or in fluid conduits/piping, back to a current cycle tank (also referred to as back-flushing or flushing). The contents of the cycle tank are then provided as feed for a subsequent unit operation. Alternatively, a sample can first be pumped out of a cycle tank and then chased by a buffer solution into a separate product collection tank, the contents of which are subsequently provided as feed for the next unit operation.

In further embodiments, adequate time remains at the end of each diafiltration cycle to provide for a rapid regeneration cycle to be performed on the membrane, which can assist with maintaining constant diafiltration fluxes over extended cycling operations. Rapid regeneration cycles may not need to be performed following each diafiltration cycle, and can be invoked periodically or on an as-needed basis.

In yet further embodiments, following all diafiltration cycles, the system undergoes a full or partial clean-in-place (CIP) procedure. Alternatively, or in addition, all or some of the fluid conduits and system components are replaced. For example, TFF filtration assemblies that include single-use modules may have such modules removed and discarded, or cycling tanks that include single-use bags may have such bags discarded.

Diafiltration can be performed by various control methods. In one embodiment, continuous diafiltration processes are constant-volume diafiltration processes in which a total volume of the sample is maintained at a constant value throughout diafiltration. In constant-volume diafiltration processes, buffer is added to the cycle tank at a same rate that filtrate is removed. Alternatively, conventional batch diafiltration processes can be performed in which a large volume of diafiltration buffer is added to a cycle tank, and the sample undergoes repeated concentration filtration until a certain retentate volume is reached. When a certain retentate volume is reached, additional buffer is added, and the process repeats until a desired total volume of buffer has been added.

In another embodiment, continuous diafiltration processes of the present invention are optimum diafiltration processes. In optimum diafiltration processes, the volume and concentration of product are allowed to change along a controlled path throughout the process to optimize buffer use, product yield, and buffer exchange for a particular application. Optimum diafiltration processes may be particularly suited to operations in which removal of a component that is partially retained in the sample is desired, such as, for example, in a diafiltration process that, in addition to exchanging buffer, also involves separating proteins from a sample containing a nucleic acid product.

Control methods for diafiltration can be effected by various control strategies. In one embodiment, continuous diafiltration processes are controlled through monitoring and adjustment of TFF membrane crossflow and transmembrane pressure (TMP). TFF membrane crossflow can be controlled by adjusting a feed flow rate, a retentate flow rate, an average crossflow rate, and/or a pressure drop setpoint for a feed pump. TMP can be controlled by a retentate pressure control valve or by an overlay pressure applied to the cycle tank. During diafiltration, a recirculating product volume can be controlled to either a constant set point (e.g., constant-volume diafiltration) or to a variable set point based on an algorithm that optimizes a concentration of the product and/or buffer species in the cycle tank (e.g., optimum diafiltration). Volume control can be monitored by a level probe or by load cells associated with the cycle tanks. Alternatively, flowmeters, totalizers, and/or weight scales can be used to measure a buffer addition flow rate and a permeate removal flow rate. Such measurements can be provided to a controller (e.g., controller 160), which can monitor the diafiltration process and effect adjustments to crossflow and TMP, such as by toggling valves or adjusting pump speeds.

Endpoint control for diafiltration can also be effected by various endpoint control strategies. In one embodiment, a diafiltration endpoint can be based on a totalized volume of diafiltration buffer added and/or a totalized volume of permeate removed, as measured by flow totalizers or weight scales located at or near fluid conduits and tanks of the system, or time based measurements. In another embodiment, a diafiltration endpoint can be triggered based upon a measurable quality of the permeate or retentate stream that indicates an adequate buffer exchange has occurred. For example, a diafiltration endpoint can be a solution adjustment such as conductivity reduction where the diafiltration is run to reduce the conductivity prior to a next step such as TFF or an ion exchange chromatography process. Examples of measurable qualities include pH, conductivity, refractive index, UV, turbidity, particle-size measurement, or near-real-time direct measurement of an excipient, impurity, or target product concentration (e.g., as determined by high-performance liquid chromatography (HPLC) or other analytical equipment) at-line or inline.

Product recovery can also be effected by various recovery strategies. In one embodiment, flow rate and/or pump speed setpoints are monitored for a feed pump and/or diafiltration pump (e.g., pumps, 122, 152). In a further embodiment, a tank recovery endpoint is monitored and controlled based upon measured values obtained from level, weight, and/or air sensors, a measured volume totalization, a timed drain duration, or other means of sensing that a tank is empty.

Lastly, buffer flush recovery can be controlled by various recovery strategies. In some embodiments, buffer flushing is monitored and controlled based upon a buffer pump flow rate, speed, and/or discharge pressure. A buffer flush endpoint can be triggered by a flush duration, totalized volume, recovery vessel of buffer vessel weight, an air sensor, or other measureable quality of the protein/buffer solution, such as an ultraviolet (UV) signal.

In some embodiments, in addition to effecting a buffer exchange, continuous diafiltration systems and methods can also optionally provide for filtration of relatively low molecular-weight species from other sample components. Examples of filter-permeable components from retained components include salts from proteins, proteins from nucleic acids, protein products from cells or flocs, viruses and host cell proteins from cells, refolding reagents from proteins, alcohol from proteins, unreacted polyethylene glycol (PEG) from PEGylated proteins, unreacted toxins from antibody drug conjugates (ADCs,) and unreacted carbohydrates from conjugate vaccines.

Systems and methods of the present invention can include diafiltration by microfiltration, ultrafiltration, reverse osmosis, or nanofiltration, depending upon the molecules to be separated. Particular examples of suitable diafiltration membranes include Biomax®-30 kD membranes and Ultracel®-30 kD membranes (EMD Millipore, Bedford, Mass.) or other suitable membrane size cutoffs to retain the components of interest.

Examples of suitable buffer solutions for use in systems and methods of the present invention include water, purified waters, phosphate buffered saline (PBS), acetates, and histidines.

EXEMPLIFICATION

Example 1: Feasibility of Small Batch Processing

The feasibility of processing small batches (approximately 200 mL) of sample was demonstrated at lab bench scale by running diafiltration of a 67 g/L polyclonal IgG solution through a standard recirculating TFF system at a variety of feed fluxes using either one or two membrane devices, arranged in series or in parallel, and determining the time, membrane area, and pump passes that would be required to achieve 8 diavolumes of buffer exchange.

Figure 5:
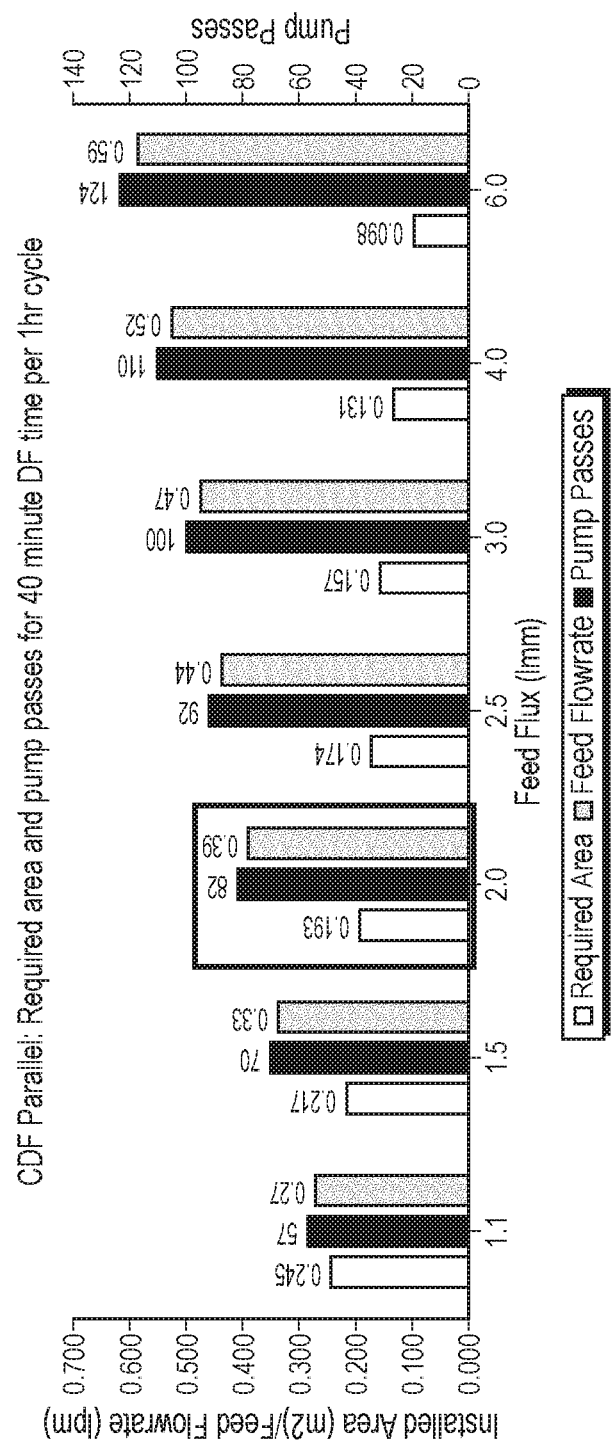
FIG. 5 is a graph of feed flux versus pump passes, and required area/flow rate of small batch experimental results using a parallel configuration of TFF filters.
Figure 6:
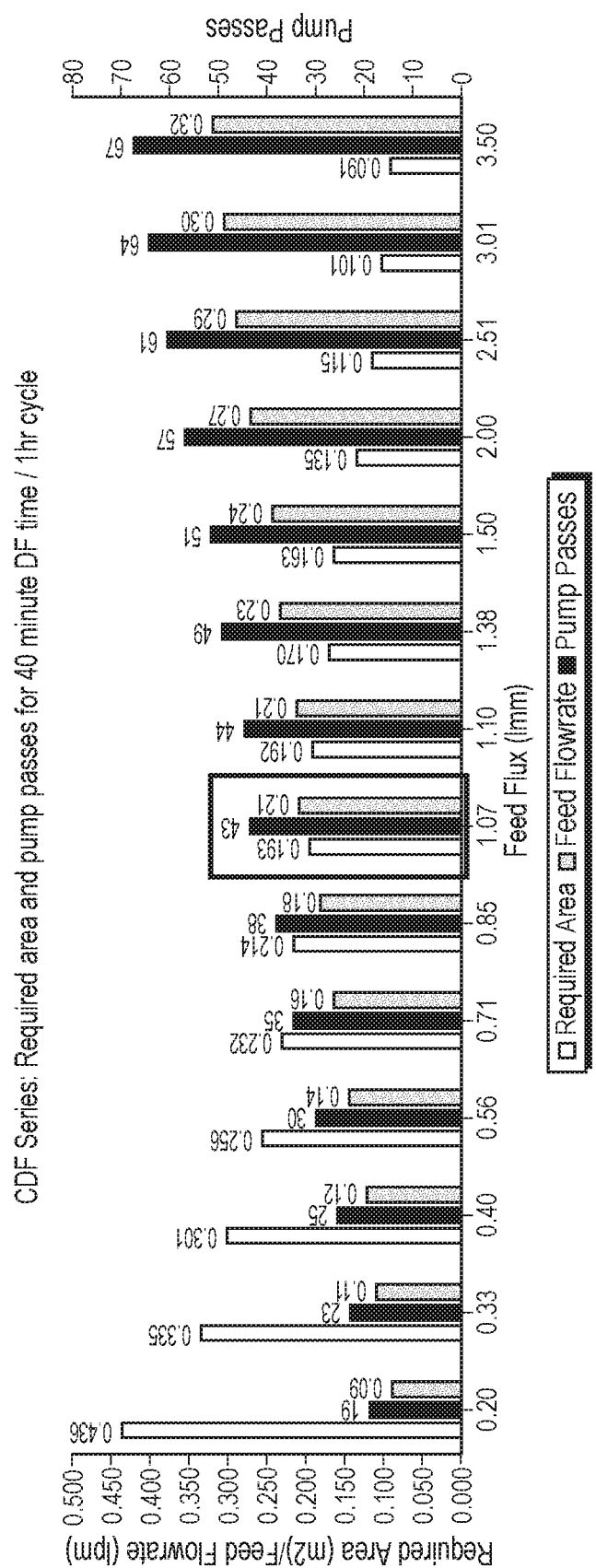
FIG. 6 is a graph of feed flux versus pump passes, and required area/flow rate of small batch experimental results using a series configuration of TFF filters.

The tradeoff between membrane area, pump passes, and feed flowrate as a function of feed flux is shown in FIG. 5 for the parallel devices and FIG. 6 for the series devices. The total run time of the parallel configuration was 13.33 hours/day, versus 3 hours for an equivalent batch diafiltration system, with a 4.4 fold reduction in area. Determination of an optimal area and feed flux for diafiltration is shown in the rectangular box of FIG. 5. Process details for an equivalent batch diafiltration system are shown in Table 1.

TABLE 1

| Batch Process Baseline | | | |
|---|---|---|---|
| Bioreactor Volume | 200 | L | |
| Vessel Volume per day | 1 | Vvd | |
| Titer | 1.5 | g/L | |
| Purification Yield | 85% | % | |
| Protein Concentration Final UFDF Feed | 20 | g/L | |
| Volume of Feed | 12.75 | L | |
| Hours per day UFDF operation | 20 | hrs | *assumes 4 hrs downtime per day |
| Feed Flowrate SPTFF I | 0.64 | L/hr | *or 10.6 ml/min |
| Protein Concentration out of SPTFF I | 67 | g/L | *based on current optimal protein concentration ($C_{opt}$) |
| Feed Flowrate to DF system | 3.2 | | |
| Volume of Feed to DF | 190 | | *or 0.190 L |
| | | | *assume 1 hr fill time |
| Installed area | 0.22 | m² | *for current study |
| Process Time | 3 | Hrs | |
| Permeate Flux at 6 lmm | 29.2 | LMH | |
| Batch Volume | 3.8 | L | |
| DF Volume for 10 DV | 38.1 | L | |
| Area Required | 0.4345 | m² | |
| Feed Flux | 6 | lmm | |
| Pump Passes | 123 | Passes | |

A low membrane area running in either series or parallel flow at feed fluxes that are lower than typical batch recommendations allow for processing of 2-4 fold more kg/m² per day at 0.3-0.6 of the number of pump passes typically required.

Example 2: Product Recovery

Figure 7:
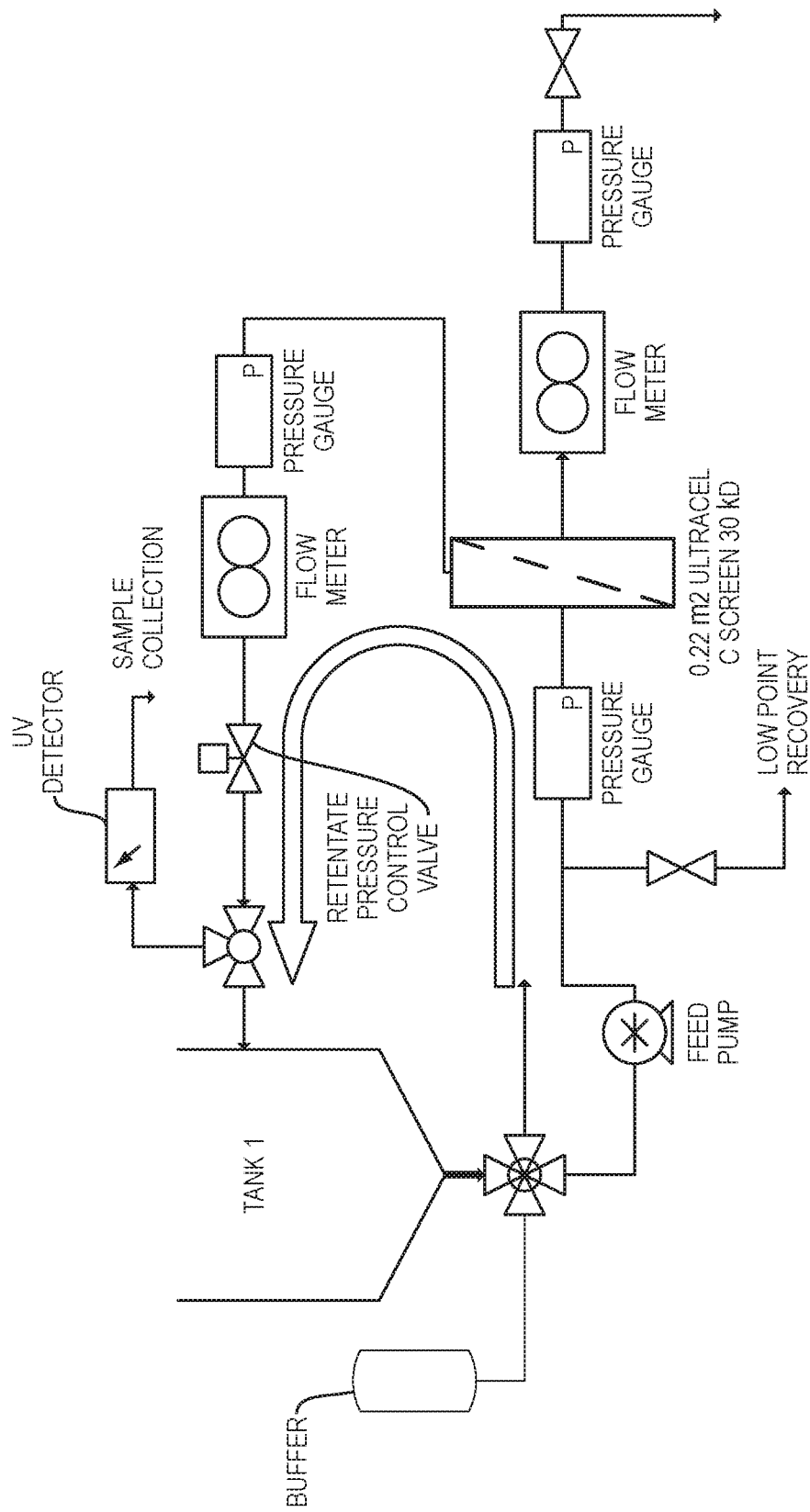
FIG. 7 is a schematic illustrating a forward-mode recovery process.
Figure 8:
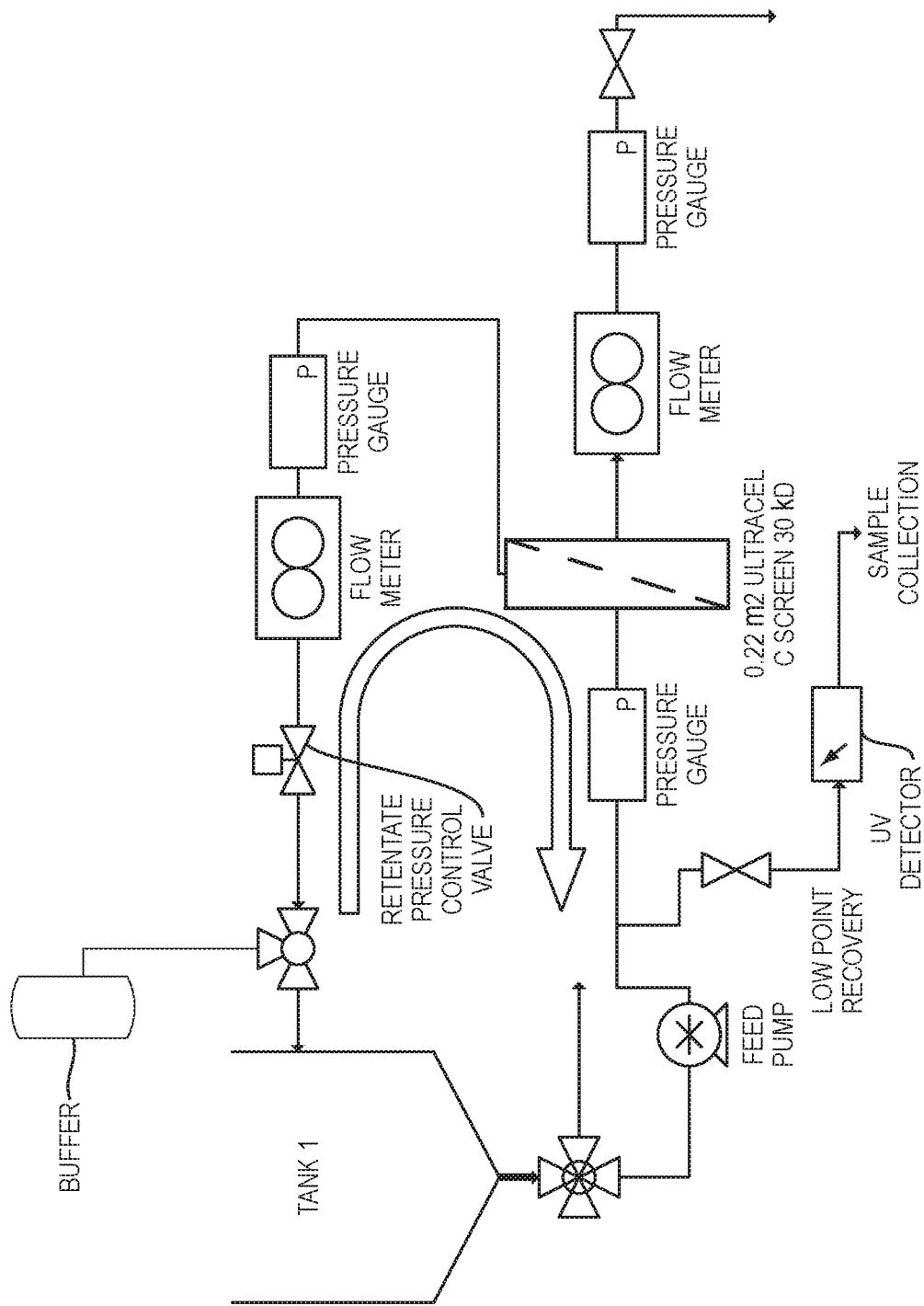
FIG. 8 is a schematic illustrating a reverse-mode recovery process.

Product recovery in both forward mode (out to non-cycling product collection vessel, FIG. 7) and reverse mode (back to same-cycle recirculation vessel, FIG. 8) was evaluated to quantify achievable percentage recovery versus extent of buffer dilution required for recovery.

Yield was greater than 98% in all four configurations, with a dilution of protein concentration by approximately 30-50%. These data are shown in Table. 2.

TABLE 2

Product Recovery of four configurations with 2 × 0.11 m² Pellicon ® 3 Ultracel 30 kD C screen and DF concentration = 67 g/L

| Membrane configuration | Recovery Direction | Recovery (%) | Pool Concentration (g/L) |
|---|---|---|---|
| Parallel | Forward | 98.3% | 48.9 |
| Parallel | Reverse | 98.2% | 46.56 |
| Series | Forward | 98.2% | 59.65 |
| Series | Reverse | 98.2% | 43.9 |

Mass balance indicated <1% residual protein from one cycle remained in the tank, which could be easily flushed to drain within the available time window such that carry-over into the subsequent cycle would not be a concern.

Example 3: Process Performance and Consistency

Figure 9:
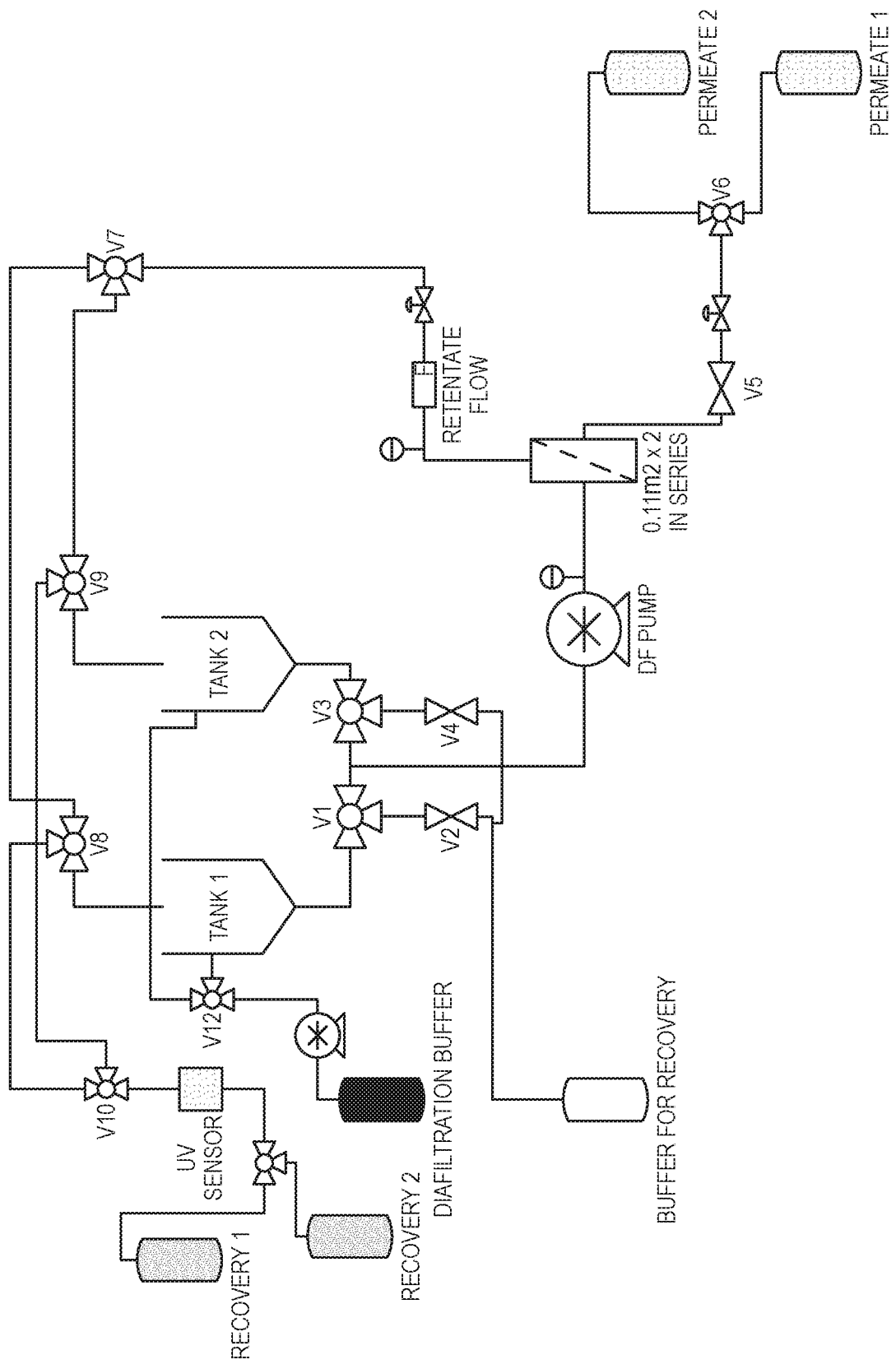
FIG. 9 is a schematic illustrating an experimental diafiltration system with two cycling tanks.
Figure 10:
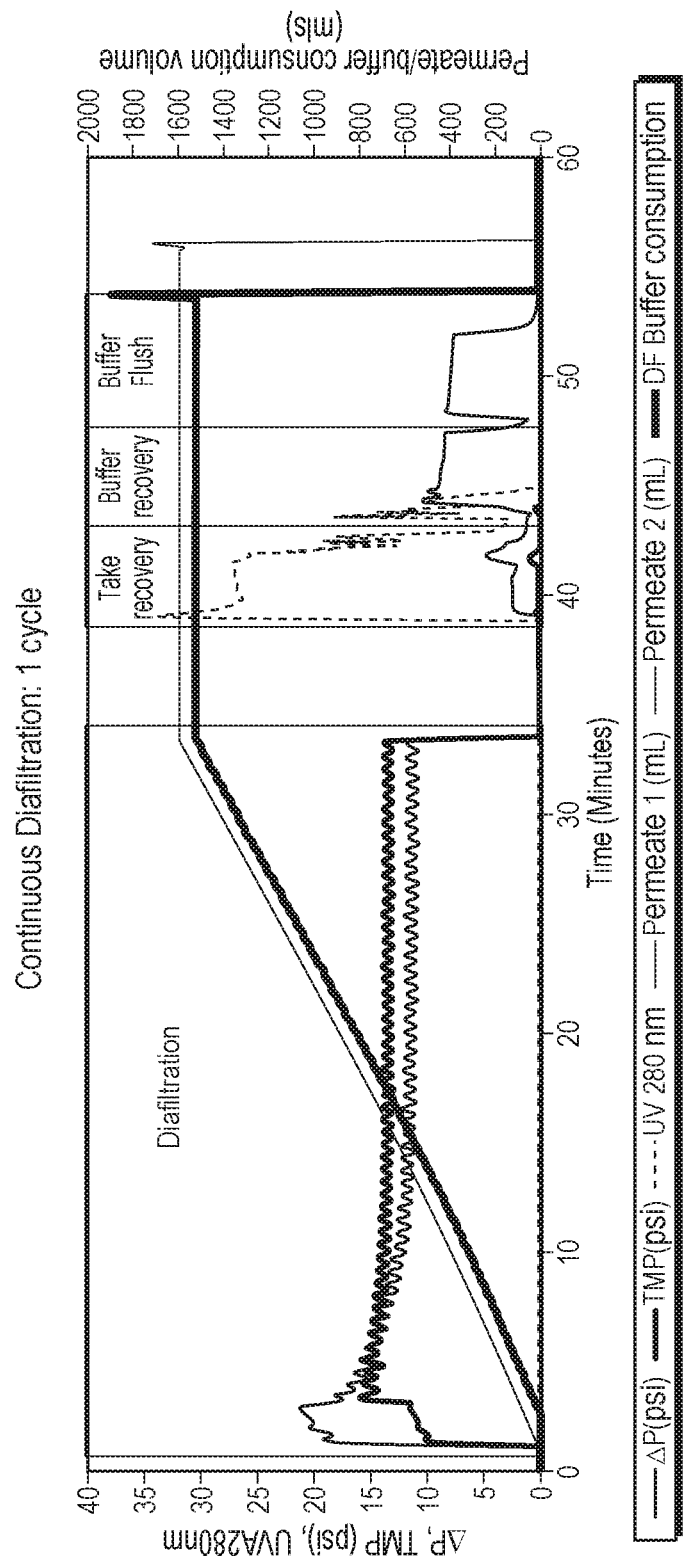
FIG. 10 is a graph of change in pressure, transmembrane pressure, product recovery UV-reading, and permeate/buffer consumption volume over time for an experimental first continuous diafiltration cycle.
Figure 11:
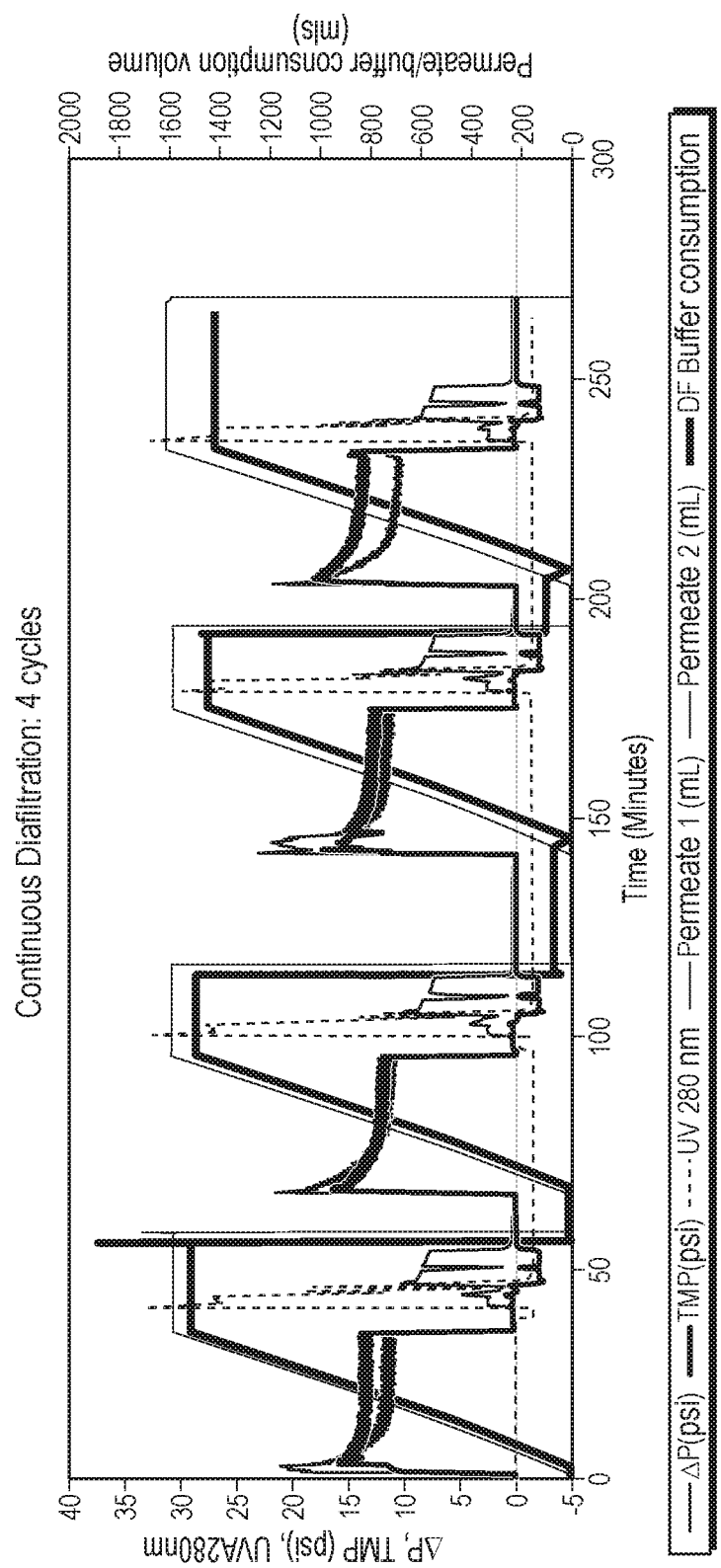
FIG. 11 is a graph of change in pressure, transmembrane pressure, product recovery UV-reading, and permeate/buffer consumption volume over time for four experimental continuous diafiltration cycles.
Figure 12:
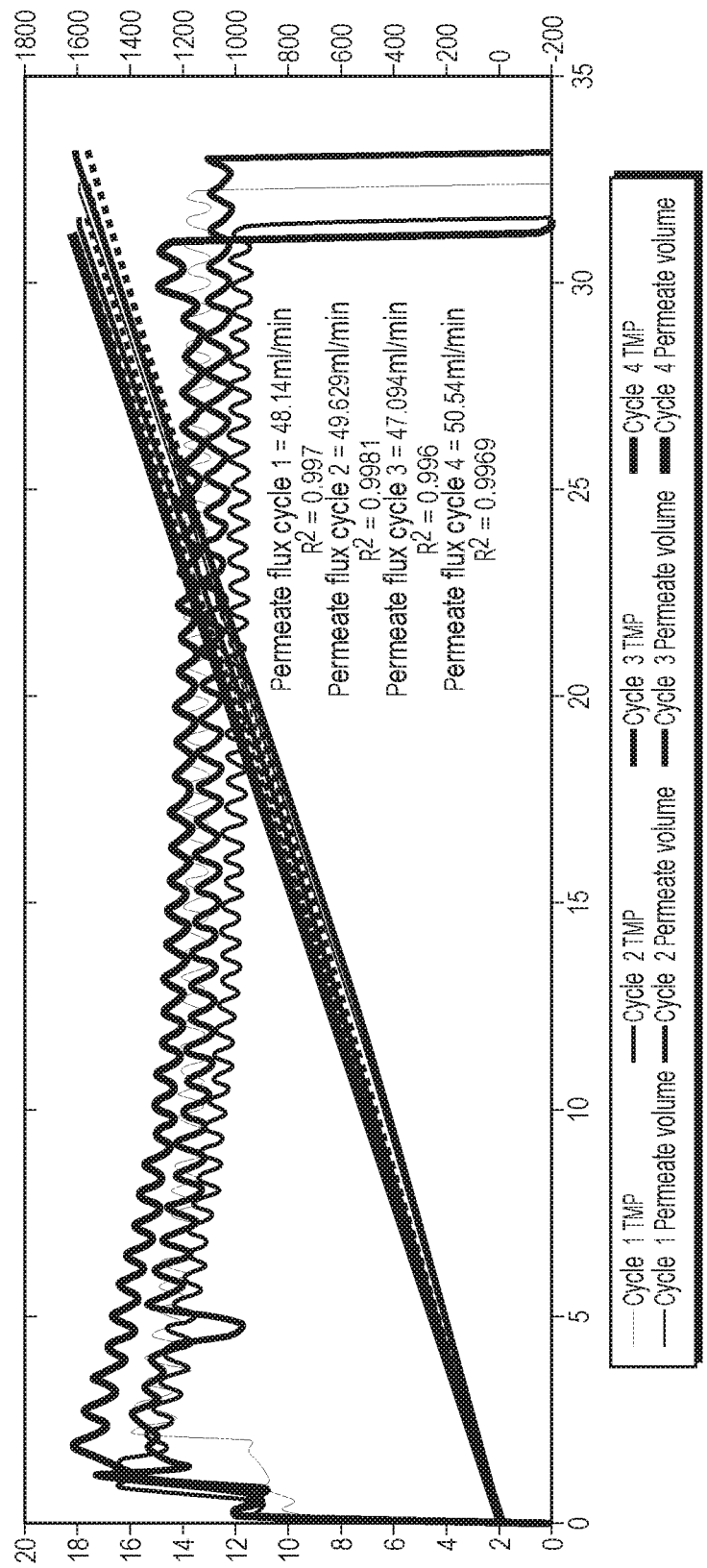
FIG. 12 is a graph of the TMP and Cumulative Permeate Volume vs diafiltration time for 4 consecutive cycles of DF on the same membrane.
Figure 15:
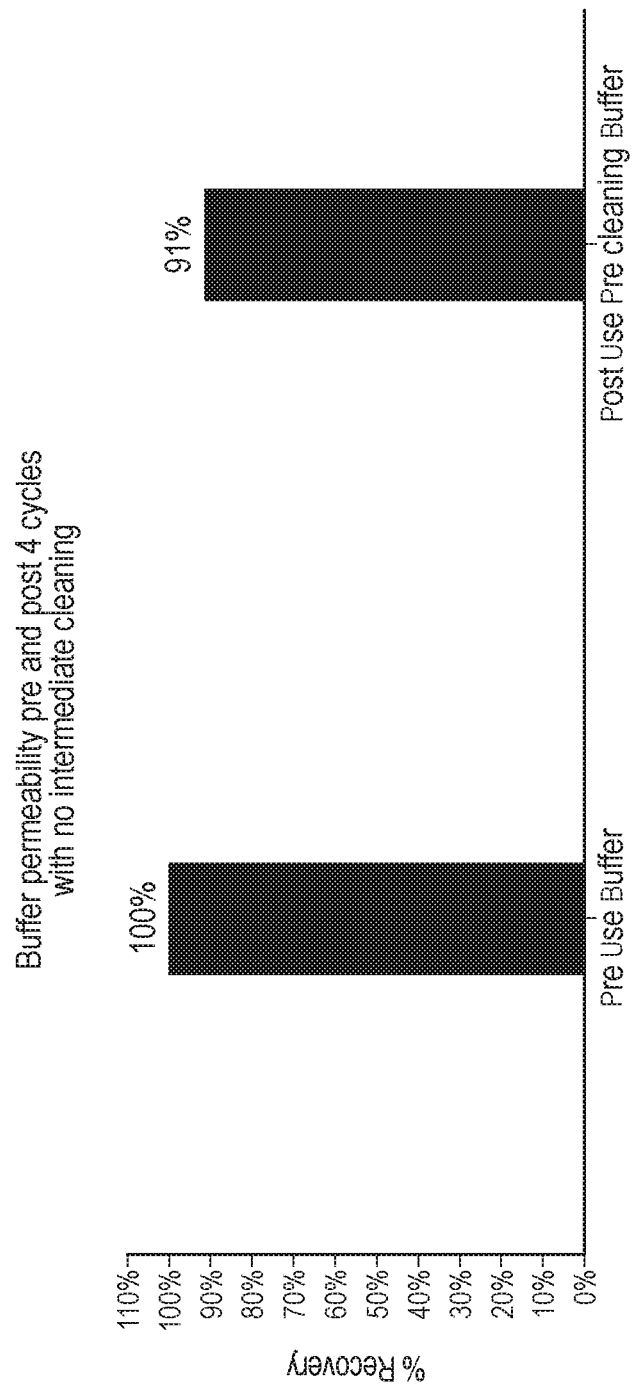
FIG. 15 is a graph of membrane permeability obtained without cleaning after the four continuous diafiltration cycles of FIGS. 9-14.

Process performance and consistency was demonstrated for four consecutive cycles of the 2-cycling tank configuration shown in FIG. 9 with no cleaning between cycles. The steps of each cycle are shown in Table 3. The results are shown in FIGS. 10-15.

TABLE 3

Continuous tanking cycling diafiltration steps

| Step | End point | Step duration | Flowrate (ml/min) | Comments |
|---|---|---|---|---|
| 8 DV diafiltration | Diafiltration buffer = 8 DV (1520 ml) | ~32.5 minutes | 220 ml/min (1 lmm) | Increase to 10 DV will add ~8 minutes increasing the total DF time to 38 minutes. Permeate volume was higher = 8 DV DF + initial buffer hold up of system (~85 ml) = ~1600 ml |
| Tank recovery | Tank is fully rained | ~3 minutes | 50 ml/min | |
| Buffer recovery | Total recovery Tank + buffer recovery = 290 ml/min | ~3 minutes | 50 ml/min | End point based on minimum dilution for recover > 98% recovery from the recovery studies |
| Buffer flush | 190 ml (1 DV) | ~4 minutes | 50 ml/min | |
| Total Cycle time | | 42.5 minutes | | 50.5 minutes for 10 DV |

Feed flow, retentate pressure, tank level, and diafiltration (DF) buffer addition were all successfully controlled to setpoint over the four cycles.

Cycle times, number of diavolumes, yields, final protein concentrations, and mass balances were consistent over all four cycles.

As reflected in the cells of FIG. 14 with arrows, the vessel used in the experiments has a lip which retains approximately 2 ml of volume, which cannot be recovered during tank recovery. In this experiment, that volume was not recovered after cycles 1 and 2 and was carried over to cycles 3 and 4, thus appearing as a tank residual in cycles 3 and 4. This volume was collected after cycles 3 and 4. To calculate the cycle yield, the volume collected after cycles 3 and 4 was added to that of cycles 1 and 2. Tank designs can be optimized to improve drainability or a buffer addition recovery method can be performed.

No degradation in process flux was seen, even though no cleaning was performed between cycles, indicating that the process could likely be maintained for significantly longer durations.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A system for filtering a liquid sample, comprising:
    first and second cycling tanks;
    a first valve can be configured to direct a flow of a liquid sample to either the first or second cycling tank;
    a continuous diafiltration (CDF) assembly downstream of said first and second cycling tanks, comprising at least one tangential flow filter (TFF);
    a second valve configured to direct a flow of the liquid sample to the CDF assembly from the first or second cycling tank;
    a diafiltration pump;
    a third valve configured to direct a flow of buffer solution to retentate of the CDF assembly returning to the first or second cycling tank; and
    a controller configured to toggle the first valve to alternately direct the liquid sample to one of the first and second cycling tanks while toggling the second valve to direct liquid sample to the CDF assembly from the first or second cycling tanks, and toggling the third valve to direct buffer solution to the retentate of the CDF assembly returning to the first or second cycling tanks, by a continuous diafiltration process.

2. The system of claim 1, further comprising a single-pass tangential flow filtration (SPTFF) filtration module upstream of the first and second cycling tanks.

3. The system of claim 1, further comprising a holding tank downstream of the first and second cycling tanks.

4. The system of claim 1, further comprising a single-pass tangential flow filtration (SPTFF) filtration module downstream of the first and second cycling tanks.

5. The system of claim 1, further comprising a diafiltration buffer tank, the diafiltration pump in fluid communication with 1) the diafiltration buffer tank and the first and second cycling tanks, or 2) a fluid conduit configured to direct retentate to the first and second cycling tanks, wherein the controller is further configured to control a flow rate of the buffer solution at the diafiltration pump.

* * * * *